United States Patent
Iwata et al.

(10) Patent No.: US 8,233,359 B2
(45) Date of Patent: Jul. 31, 2012

(54) MAGNETIC RECORDING MEDIUM, MAGNETIC RECORDING/REPRODUCING APPARATUS, AND MAGNETIC RECORDING/REPRODUCING METHOD

(75) Inventors: Noboru Iwata, Osaka (JP); Yoshiteru Murakami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 466 days.

(21) Appl. No.: 12/513,110

(22) PCT Filed: Jul. 17, 2007

(86) PCT No.: PCT/JP2007/064063
§ 371 (c)(1),
(2), (4) Date: Apr. 30, 2009

(87) PCT Pub. No.: WO2008/056467
PCT Pub. Date: May 15, 2008

(65) Prior Publication Data
US 2010/0054093 A1    Mar. 4, 2010

(30) Foreign Application Priority Data
Nov. 9, 2006 (JP) .................................. 2006-304459

(51) Int. Cl.
*G11B 11/00* (2006.01)
(52) U.S. Cl. ................................................ 369/13.33
(58) Field of Classification Search ........................ None
See application file for complete search history.

(56) References Cited

U.S. PATENT DOCUMENTS

| 5,656,385 | A | 8/1997 | Nakajima et al. |
| 6,014,296 | A | 1/2000 | Ichihara et al. |
| 6,143,436 | A | 11/2000 | Nakajima et al. |
| 6,603,619 | B1 * | 8/2003 | Kojima et al. .................. 360/59 |
| 7,839,497 | B1 * | 11/2010 | Rausch et al. ................ 356/256 |
| 2001/0046613 | A1 * | 11/2001 | Hosokawa ............. 428/694 ML |
| 2002/0022154 | A1 * | 2/2002 | Suwabe ................ 428/694 ML |
| 2002/0136927 | A1 | 9/2002 | Hieda et al. |
| 2003/0007442 | A1 * | 1/2003 | Henrichs ......................... 369/95 |
| 2003/0161221 | A1 * | 8/2003 | Shimazaki et al. ......... 369/13.05 |
| 2003/0179519 | A1 * | 9/2003 | Hasegawa ................ 360/324.12 |
| 2004/0023072 | A1 * | 2/2004 | Sugimoto et al. ...... 428/694 MM |
| 2004/0085862 | A1 | 5/2004 | Matsumoto et al. |
| 2004/0184361 | A1 * | 9/2004 | Ichihara et al. ............ 369/13.01 |
| 2004/0194119 | A1 * | 9/2004 | Miyanishi et al. ............ 720/659 |
| 2004/0240327 | A1 * | 12/2004 | Sendur et al. .............. 369/13.35 |

(Continued)

FOREIGN PATENT DOCUMENTS
JP          9-97419 A        4/1997
(Continued)

*Primary Examiner* — Joseph Feild
*Assistant Examiner* — Henok Heyi
(74) *Attorney, Agent, or Firm* — Birch, Stewart, Kolasch & Birch, LLP

(57) ABSTRACT

A magnetic recording medium (1a) includes: a plurality of magnetic dots (13), provided on a substrate (11), in each of which information is stored by heating of the magnetic body; and separator layers (50). Each of the separator layers (50) is structured such that a metallic body layer (52) and two dielectric body layers (51) are alternately stacked in an in-plane direction of the substrate (11). Each of the separator layers (50) separates two magnetic dots from each other in the in-plane direction. Both sides of each of the magnetic dots (13) in the in-plane direction of the substrate (11) have contact with two dielectric body layers (52), respectively. This provides a magnetic recording medium (1a) whose magnetic dots (13) can be entirely heated with a reduction in the amount of power that is consumed by a recording head.

13 Claims, 13 Drawing Sheets

U.S. PATENT DOCUMENTS

| | | | |
|---|---|---|---|
| 2005/0094549 A1 | 5/2005 | Hieda et al. | |
| 2005/0128925 A1* | 6/2005 | Yamashita | 369/124.1 |
| 2005/0193405 A1 | 9/2005 | Hattori et al. | |
| 2005/0213436 A1* | 9/2005 | Ono et al. | 369/13.02 |
| 2006/0075417 A1 | 4/2006 | Miyanishi et al. | |
| 2006/0110629 A1* | 5/2006 | Sato | 428/848.3 |
| 2006/0154110 A1 | 7/2006 | Hohlfeld et al. | |
| 2006/0263642 A1 | 11/2006 | Hieda et al. | |
| 2007/0058494 A1* | 3/2007 | Murakami et al. | 369/13.05 |
| 2007/0139818 A1* | 6/2007 | Shimazawa et al. | 360/126 |
| 2007/0159720 A1* | 7/2007 | Sohn et al. | 360/128 |
| 2007/0165495 A1* | 7/2007 | Lee et al. | 369/13.33 |
| 2008/0068748 A1* | 3/2008 | Olson et al. | 360/110 |

FOREIGN PATENT DOCUMENTS

| | | |
|---|---|---|
| JP | 2617025 B2 | 6/1997 |
| JP | 2000-195001 A | 7/2000 |
| JP | 2001-291277 A | 10/2001 |
| JP | 2002-279616 A | 9/2002 |
| JP | 2003-157502 A | 5/2003 |
| JP | 2004-151046 A | 5/2004 |
| JP | 2004-272997 A | 9/2004 |
| JP | 2005-243186 A | 9/2005 |
| JP | 2006-114099 A | 4/2006 |
| JP | 2006-196151 A | 7/2006 |
| JP | 2007-323736 A | 12/2007 |

* cited by examiner

TRACK LENGTH DIRECTION

TRACK LENGTH
DIRECTION

TRACK WIDTH
DIRECTION

TRACK LENGTH
DIRECTION

TRACK LENGTH DIRECTION

TRACK LENGTH DIRECTION

MOVING DIRECTION OF MEDIUM

TRACK WIDTH
DIRECTION

MAGNETIC RECORDING MEDIUM, MAGNETIC RECORDING/REPRODUCING APPARATUS, AND MAGNETIC RECORDING/REPRODUCING METHOD

TECHNICAL FIELD

The present invention relates to an information recording medium for recording and reproducing information by heating and magnetic action.

BACKGROUND ART

With the advent of an advanced information society, there has recently been an enormous increase in amount of information handled. Accordingly, there has been a need for increases in storage capacity and density of a recording apparatus. In the field of magnetic recording typified by hard disks, a recording density exceeding an area density of 300 Gbit/inch$^2$ is expected to be achieved very soon through improvements in characteristics of a recording medium, a recording head, and a reproducing head. Improvements in area density of a recording medium are still under way. It is considered that the area density will exceed 1 Tbit/inch$^2$ in the future.

In order to increase the density of a magnetic recording medium, it is necessary to miniaturize individual magnetic particles that form a magnetic bit on a magnetic recording medium. Unfortunately, a magnetic recording medium having miniaturized magnetic particles is easily affected by external thermal energy. This leads to a problem of thermal fluctuation. The problem of thermal fluctuation refers to a difficulty caused by external thermal energy in stably retaining magnetic information for a long period. The difficulty is caused in such a way that the effect of external thermal energy makes it impossible to maintain a magnetic axis in one orientation, and this causes a difficulty in stably retaining a recorded magnetization.

The effect of thermal fluctuation is determined by a correlation between magnetic anisotropic energy Ku·V (Ku: magnetic anisotropic energy; V: volume of a magnetic particle) and thermal energy kT (k: Boltzmann constant; T: temperature in a medium), which disrupts a recorded state. Specifically, the effect of thermal fluctuation becomes significant when the magnetic anisotropic energy Ku·V is decreased to about dozens of times the thermal energy kT. For this reason, in order to lessen the effect of thermal fluctuation, for example, in the case of a decrease in the volume V of the magnetic particle, it is necessary to increase the magnetic energy of the magnetic particle by adopting a material high in Ku.

As magnetic recording media that solve such a problem of thermal fluctuation and increase recording density, patterned media are known (see, for example, Patent Literature 1 and Patent Literature 2). A patterned medium is arranged such that individual magnetic particles are separated from one another by separators each made of a nonmagnetic body and one magnetic particle forms one magnetic bit, whereas a granular medium, which is a magnetic recording medium used as a conventional hard disk, is arranged such that a plurality of small magnetic particles form one magnetic bit. This is effective against the problem of thermal fluctuation because this makes it possible to increase the volume V of a magnetic particle of a patterned medium as compared to a granular medium.

Patent Literature 1 discloses a method for manufacturing a patterned medium including the steps of: forming, on a substrate, a continuous or discontinuous groove area or a zonal area containing a specific chemical component, which groove area or zonal area corresponds to a recording track zone; forming a two-dimensional regular array of self-organizing molecules or fine particles; and forming recording cells corresponding to the regular array. Patent Literature 2 discloses, as an example of a method for forming a magnetic recording layer of a patterned medium, the formation of a film of magnetic material on a predetermined substrate and the subsequent etching of the film of magnetic material via a predetermined mask. Patent Literature 2 also describes the use as a masking material of silver (Ag), chrome (Cr), tungsten (W), molybdenum (Mo), tantalum (Ta), or an alloy containing the metals as its main component, which metal or alloy is deposited in an island shape.

Media made with the aim of an increase in density of a magnetic recording medium as is the case with patterned media encompass discrete media. A discrete medium is a magnetic recording medium arranged such that magnetic tracks are separated from one another by separators each made of a nonmagnetic body. Patent Literature 3 describes the use of a discrete medium as an art for resolving a problem of cross write on adjacent magnetic tracks. This makes it possible to prevent a fringing from causing a recording bit to spread in a track width direction.

On the other hand, an optically-assisted magnetic recording method has been proposed as a recording method that makes it possible to record magnetic bits with high spatial resolution on a magnetic recording medium. The optically-assisted magnetic recording method, which attracts attention as a promising art for next-generation high-density magnetic recording, is a method in which magnetic recording is performed on a magnetic recording medium high in both coercitivity (Hc) and resistance to thermal fluctuation. Specifically, the optically-assisted magnetic recording method is a recording method in which the coercivity (Hc) of a magnetic recording medium is decreased by converging light on a surface of the magnetic recording medium and thus locally raising the temperature of the magnetic recording medium and magnetic recording is performed on the magnetic recording medium by applying an external magnetic field to an area having been decreased in the coercitivity (Hc). Patent Literature 4 discloses a method in which information is recorded by the optically-assisted magnetic recording method on a magnetic recording medium having a recording layer made of a ferrimagnetic body.

The optically-assisted magnetic recording method makes it possible to record information, by use of a relatively small magnetic field, even onto a magnetic recording medium made of a material high in magnetic anisotropic energy (Ku). This makes it possible to stably retain magnetic information and prevent loss of recorded information even in the case of a high-density magnetic recording medium that requires high magnetic anisotropic energy (Ku).

Furthermore, the optically-assisted magnetic recording method makes it possible to determine the size of a recording bit in accordance with the size of a heated area on a magnetic recording medium. Therefore, a reduction in the heated area on the magnetic recording medium makes it possible to form a minute recording bit, even if an area to which an external magnetic field is applied is large. This makes it possible to achieve magnetic recording further higher in density.

Each of Patent Literatures 5 through 7 discloses a method in which near-field light is used as a heat source for locally heating a magnetic recording medium. The near-field light here refers to light (electromagnetic field) that is generated by causing light to come into a microstructure smaller than a wavelength of light, e.g., a structure such as an aperture, and is localized only in close proximity to the aperture. The near-field light generated in the vicinity of the aperture does not propagate to another area, but stays in close proximity of the aperture.

Patent Literature 5 describes: an optically-assisted magnetic recording apparatus whose light irradiating means for irradiating a magnetic recording layer with near-field light and heating an area thus irradiated is an optical waveguide or an optical probe; and an example of application of the optically-assisted magnetic recording apparatus to a discrete medium. Patent Literature 6 discloses: a probe utilizing a planar scatterer that lessens the effect of near-field light generated at a position other than a point at which intense near-field light is generated; and an example of application of the probe to a recording/reproducing apparatus. Patent Literature 7 discloses: an electromagnetic field generating element that can (i) generate a strong near field in the vicinity of an edge of a conductor by irradiating the conductor with laser light, and, on the other hand, (ii) generate a magnetic field around the conductor by passing an electric current through the conductor; and an example of the application of the electromagnetic field generating element to an information recording/reproducing apparatus.

As described above, changing a recording medium and/or a recording method is under consideration for an increase in density of a magnetic recording medium. In particular, in a case where a patterned medium or a discrete medium and the optically-assisted magnetic recording method are combined as a magnetic recording medium and a recording method, respectively, it is possible to realize a magnetic recording medium higher in density, as compared to a case where each of the arts is solely adopted.

CITATION LIST

Patent Literature 1
Japanese Patent Application Publication, Tokukai, No. 2002-279616 A (Publication date: Sep. 27, 2002)
Patent Literature 2
Japanese Patent Application Publication, Tokukai, No. 2004-272997 A (Publication date: Sep. 30, 2004)
Patent Literature 3
Japanese Patent Application Publication, Tokukaihei, No. 9-97419 A (Publication date: Apr. 8, 1997)
Patent Literature 4
Japanese Patent Publication, No. 2617025 (Registration date: Mar. 11, 1997)
Patent Literature 5
Japanese Patent Application Publication, Tokukai, No. 2000-195001 A (Publication date: Jul. 14, 2000)
Patent Literature 6
Japanese Patent Application Publication, Tokukai, No. 2004-151046 A (Publication date: May 27, 2004)
Patent Literature 7
Japanese Patent Application Publication, Tokukai, No. 2006-114099 A (Publication date: Apr. 27, 2006)

SUMMARY OF INVENTION

In the optically-assisted magnetic recording method, as described above, it is necessary to heat a magnetic recording medium during recording. In a case where near-field light is used for the heating, plasmons converted from near-field light are converted into heat, thereby heating a magnetic recording medium.

However, the intensity of near-field light is generally much weaker than that of light at a light spot at which light emitted from a light source is converged by use of a lens. In addition, plasmons diffuse on a surface of a magnetic recording medium. Therefore, with use of low-intensity near-field light, plasmons hardly propagate through a magnetic recording medium. This accordingly causes insufficient heating of the inside of the magnetic recording medium. As a result, this makes it difficult to perform stable recording. In other words, in order to perform stable recording by the optically-assisted magnetic recording method utilizing near-field light, it is necessary to provide a recording head with a high-intensity light source for generating intense near-field light. Therefore, the optically-assisted magnetic recording method utilizing near-field light causes an increase in amount of power that is consumed by a recording head of a recording/reproducing apparatus.

The present invention was made in view of the problems. An object of the present invention is to provide a magnetic recording medium that prevents diffusion of plasmons on a surface of the magnetic recording medium so as to cause an intense concentration of an electric field inside the magnetic recording medium and thereby makes it possible to sufficiently heat an entire magnetic body while reducing the amount of power that is consumed by a recording head.

The present invention makes it possible to prevent plasmons from diffusing on a surface of a magnetic recording medium, and as such, makes it possible to locally heat a magnetic recording medium suitable for high-density recording.

In order to solve the problems, a magnetic recording medium includes: a substrate; a plurality of magnetic bodies, provided on the substrate, in each of which information is stored by heating of the magnetic body; and a plurality of separators in each of which a metallic body and two first dielectric bodies are alternately stacked in an in-plane direction of the substrate; each of the separators separating adjacent two of the magnetic bodies from each other in the in-plane direction, both sides of each of the magnetic bodies in the in-plane direction having contact with two first dielectric bodies, respectively.

According to the arrangement, the magnetic bodies are separated from one another in the in-plane direction of the substrate by the separators, in each of which a metallic body and two first dielectric bodies are alternately stacked. Both sides of each of the magnetic bodies in the in-plane direction of the substrate have contact with two first dielectric bodies, respectively. That is, a metallic body is provided in a separator so as to be sandwiched between two first dielectric bodies. An interface between a metallic body and a first dielectric body is provided around a magnetic body. An interface between a first dielectric body and a metallic body is formed in a depth direction of the magnetic recording medium.

Therefore, plasmons converted from near-field light on a surface of the magnetic recording medium propagate selectively through an interface between a dielectric body and a metallic body to form localized plasmons that are localized at an interface between a first dielectric body having contact with a magnetic body and a metallic body. This causes a concentration of an electric field, thereby heating the magnetic body.

According to the arrangement of the present invention, two first dielectric bodies are provided on both sides of a magnetic body, respectively, and a metallic body is stacked on such a first dielectric body. This makes it possible to cause an intense concentration of an electric field at each sides of the magnetic body. In addition, since plasmons propagating through the interface propagate inward through the magnetic recording medium, it is possible to cause a concentration of an electric field inside the magnetic recording medium. This makes it possible to efficiently heat the magnetic body not only from the surface of the magnetic recording medium but also from within the magnetic recording medium, thus making it possible to heat the entire magnetic body. Thus, it is possible to sufficiently heat the whole of magnetic body by causing an intense concentration of an electric field around the magnetic body, without increasing the intensity of near-field light.

This makes it unnecessary to increase the amount of power that is supplied to a light source, thus bringing about an effect of sufficiently heating an entire magnetic body while reducing the amount of power that is consumed by a recording head.

Plasmons converted from near-field light propagate selectively through an interface between a first dielectric body and a metallic body, and as such, can be prevented from diffusing on a surface of a magnetic recording medium. This makes it possible to cause a concentration of an electric field only around a magnetic body, thus bringing about an effect of locally heating the magnetic recording medium.

The magnetic recording medium according to the present invention preferably further includes a second dielectric body between the substrate and each of the separators.

According to the arrangement, a second dielectric body is further provided between (i) the substrate and (ii) a metallic body and two first dielectric bodies. Therefore, plasmons having propagated through an interface between a metallic body and a first dielectric body also propagate through an interface between the metallic body and a second dielectric body.

This makes it possible to cause a concentration of an electric field also at the bottom of a metallic body on the substrate side. This further intensifies a concentration of an electric field caused around a magnetic body, thus bringing about an effect of heating an entire magnetic body more sufficiently.

The magnetic recording medium according to the present invention is preferably further arranged such that the metallic bodies are made of gold, silver, aluminum, platinum, or an alloy containing any one of the metals.

Gold, silver, aluminum, platinum, and the alloy containing the metals are high in efficiency of plasmon propagation. Therefore, according to the arrangement, plasmons converted from near-field light can be propagated efficiently at an interface between a metallic body and a first dielectric body.

This brings about an effect of causing an intense concentration of an electric field at such an interface on each sides of a magnetic body.

The magnetic recording medium according to the present invention preferably further includes, between the magnetic bodies and the substrate, a soft magnetic body lower in coercitivity than the magnetic bodies.

The soft magnetic body is provided for amplifying a recording magnetic field applied by a magnetic head during recording. The shorter the distance between the soft magnetic body and a magnetic body is, the larger the effect of the soft magnetic body becomes.

In the magnetic recording medium thus arranged, the soft magnetic body has contact with the magnetic bodies. Therefore, a magnetic field generated by the soft magnetic body and an exchange coupling force between the magnetic bodies and the soft magnetic body aid an external magnetic field applied during recording. This makes it possible to apply a recording magnetic field to each of the magnetic bodies more effectively.

This makes it possible to reduce a recording magnetic field to be applied to a magnetic body, thus bringing about an effect of realizing stable high-density recording.

The magnetic recording medium according to the present invention preferably further includes, on each of the magnetic bodies, an antioxidant film for preventing oxidation of the magnetic bodies.

The foregoing arrangement makes it possible to prevent a magnetic body from being oxidized in a step of manufacturing a magnetic recording medium. This brings about an effect of manufacturing a magnetic recording medium utilizing an easily-oxidizable magnetic body such as a magnetic body containing a rare-earth metal.

The magnetic recording medium according to the present invention is preferably further arranged such that the separators are provided perpendicularly to a track width direction.

The foregoing arrangement makes it possible to manufacture a magnetic recording medium in which magnetic tracks are separated from one another by separators. This makes it possible to manufacture a so-called discrete medium, thus allowing a further increase in density of a magnetic recording medium.

The magnetic recording medium according to the present invention is preferably further arranged such that the separators are provided perpendicularly to both a track width direction and a track length direction.

The foregoing arrangement makes it possible to manufacture a magnetic recording medium in which individual magnetic particles are separated from one another by separators. This makes it possible to manufacture a so-called patterned medium, thus allowing a further increase in density of a recording medium.

The present invention encompasses a magnetic recording/reproducing apparatus including: near-field light generating means for irradiating, with near-field light, any one of the magnetic recording media described above; magnetic field applying means for applying a magnetic field to the magnetic recording medium; and magnetic field detecting means for detecting a leakage magnetic field generated from the magnetic recording medium.

Performing recording on the recording medium by the optically-assisted magnetic recording method brings about an effect of making it possible to realize a recording/reproducing apparatus capable of carrying out recording and reproduction with respect to a high-density magnetic recording medium without any problem of thermal fluctuation.

The present invention further encompasses a magnetic recording/reproducing method including the steps of: irradiating, with near-field light, any one of the magnetic recording media described above; recording magnetic information in the magnetic bodies of the magnetic recording medium by applying a magnetic field to the magnetic recording medium; and reproducing the recorded magnetic information by detecting a leakage magnetic field generated from the magnetic recording medium.

Additional objects, features, and strengths of the present invention will be made clear by the description below. Further, the advantages of the present invention will be evident from the following explanation in reference to the drawings.

Figure 4:
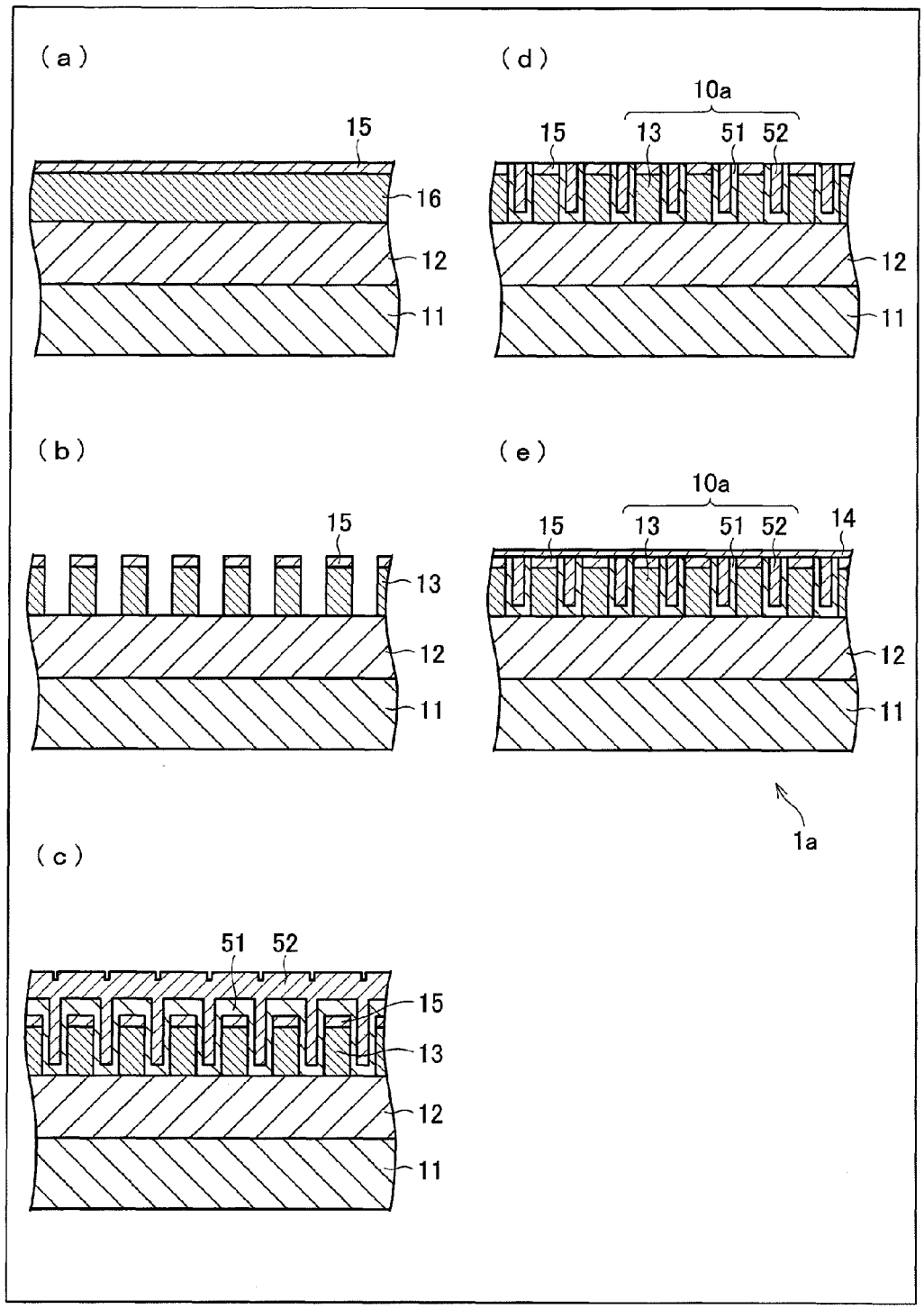

FIG. 4 illustrates a modification of the method for manufacturing a magnetic recording medium according to the present invention. (a) of FIG. 4 illustrates a step of forming a soft magnetic body layer, a magnetic body layer, and an antioxidant film on a substrate. (b) of FIG. 4 illustrates a step of forming magnetic dots from the magnetic body layer. (c) of FIG. 4 illustrates a step of forming a dielectric body layer and a metallic body layer. (d) of FIG. 4 illustrates a step of polishing a surface of the magnetic recording medium. (e) of FIG. 4 illustrates a step of forming a protecting layer.

Figure 5:
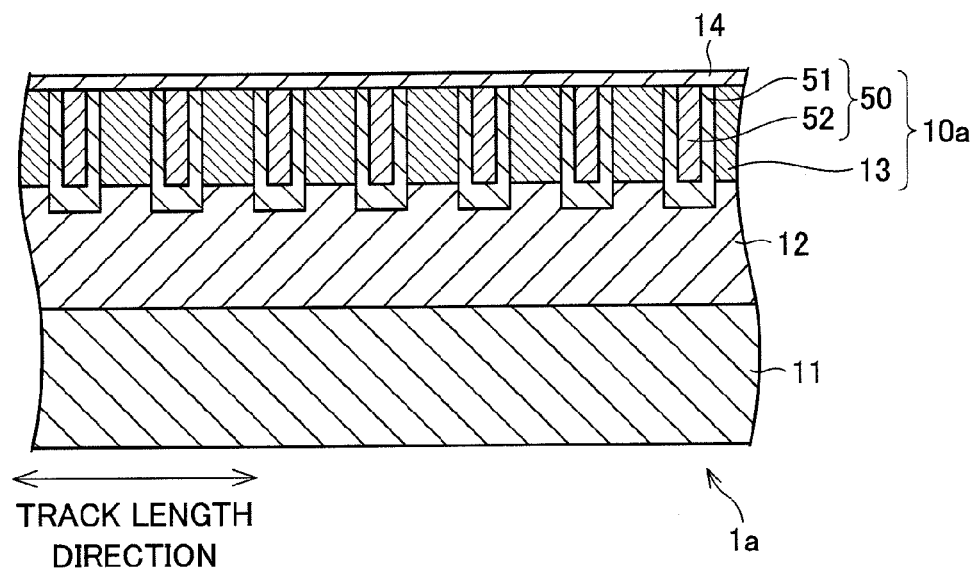

FIG. 5 is a schematic cross-sectional view of a modification of the magnetic recording medium according to Embodiment 1.

Figure 6:
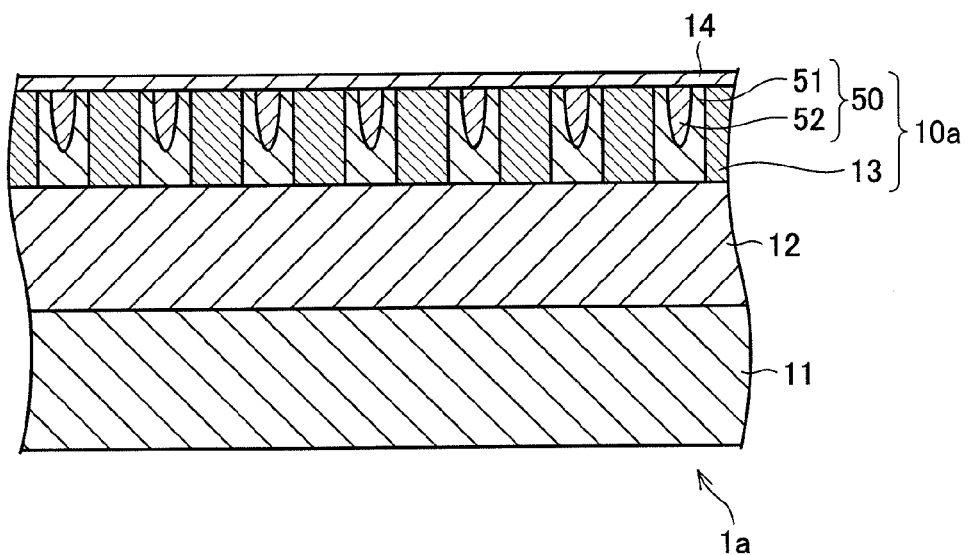

FIG. 6 is a schematic cross-sectional view of another modification of the magnetic recording medium according to Embodiment 1.

Figure 7:
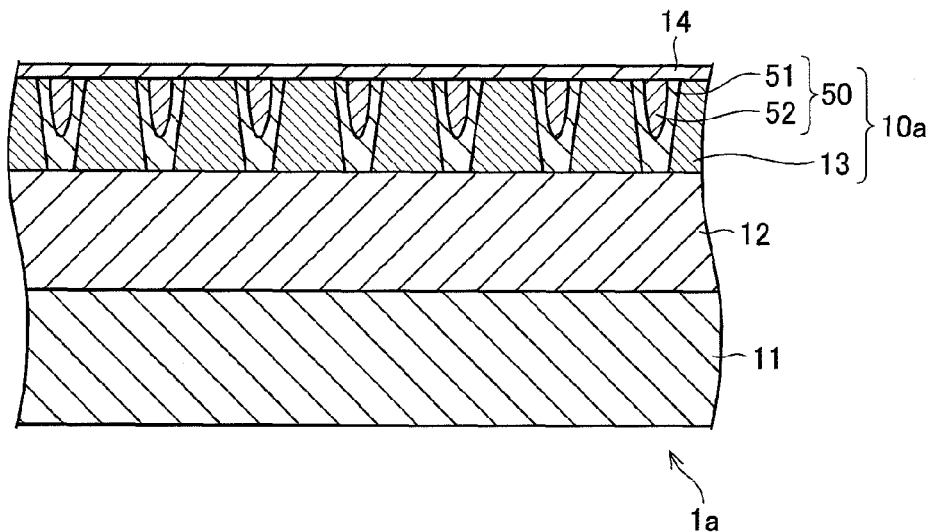

FIG. 7 is a schematic cross-sectional view of further another modification of the magnetic recording medium according to Embodiment 1.

Figure 8:
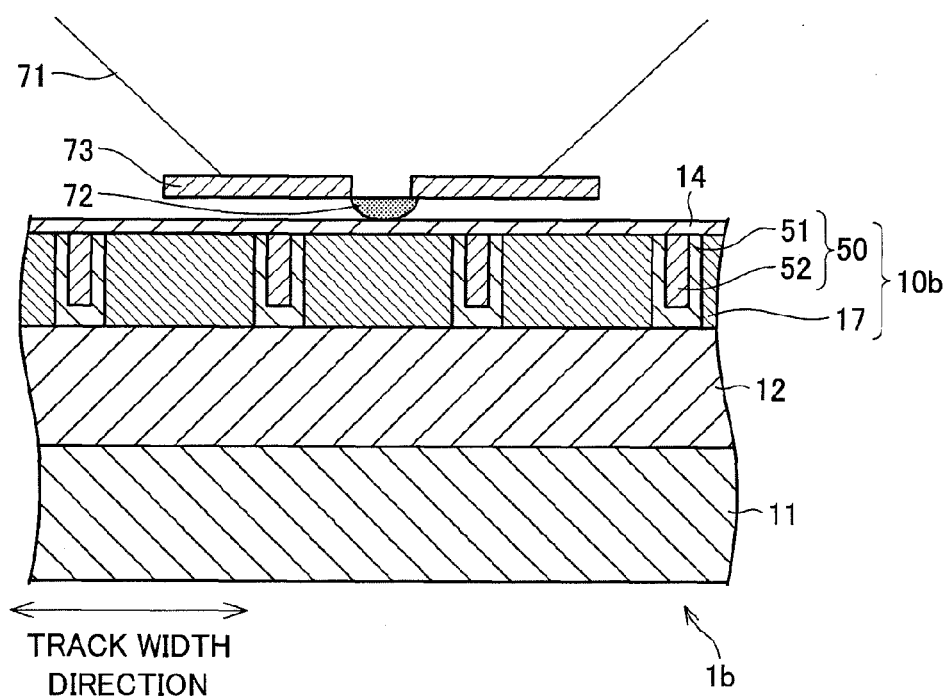

FIG. 8 is a schematic cross-sectional view of a magnetic recording medium according to Embodiment 2.

Figure 9:
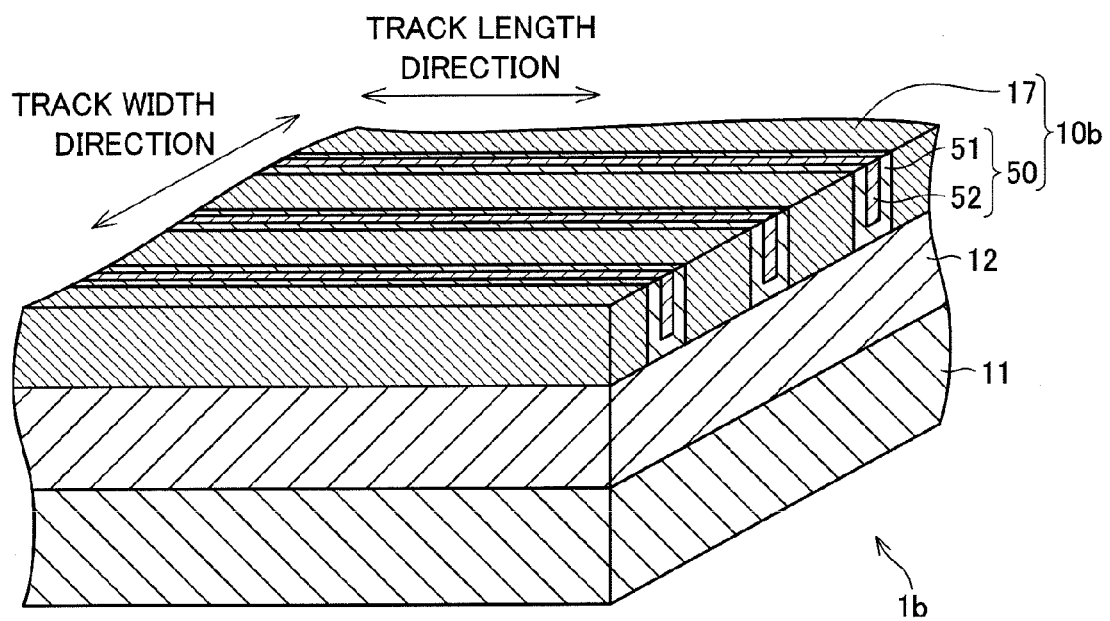

FIG. 9 is a schematic perspective view of the magnetic recording medium according to Embodiment 2.

Figure 10:
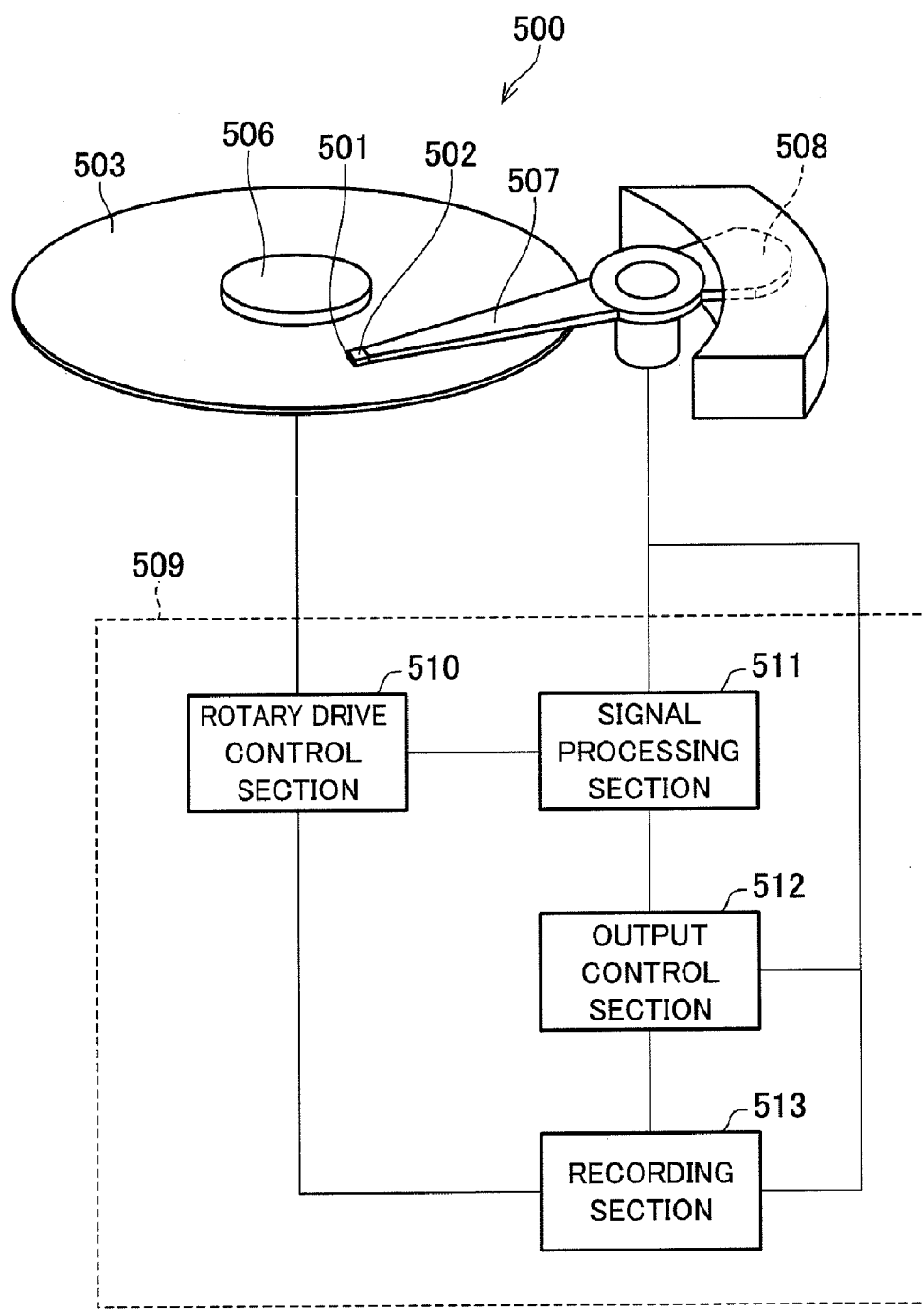

FIG. 10 is a block diagram illustrating an arrangement of a main part of a magnetic recording/reproducing apparatus according to Embodiment 3.

Figure 11:
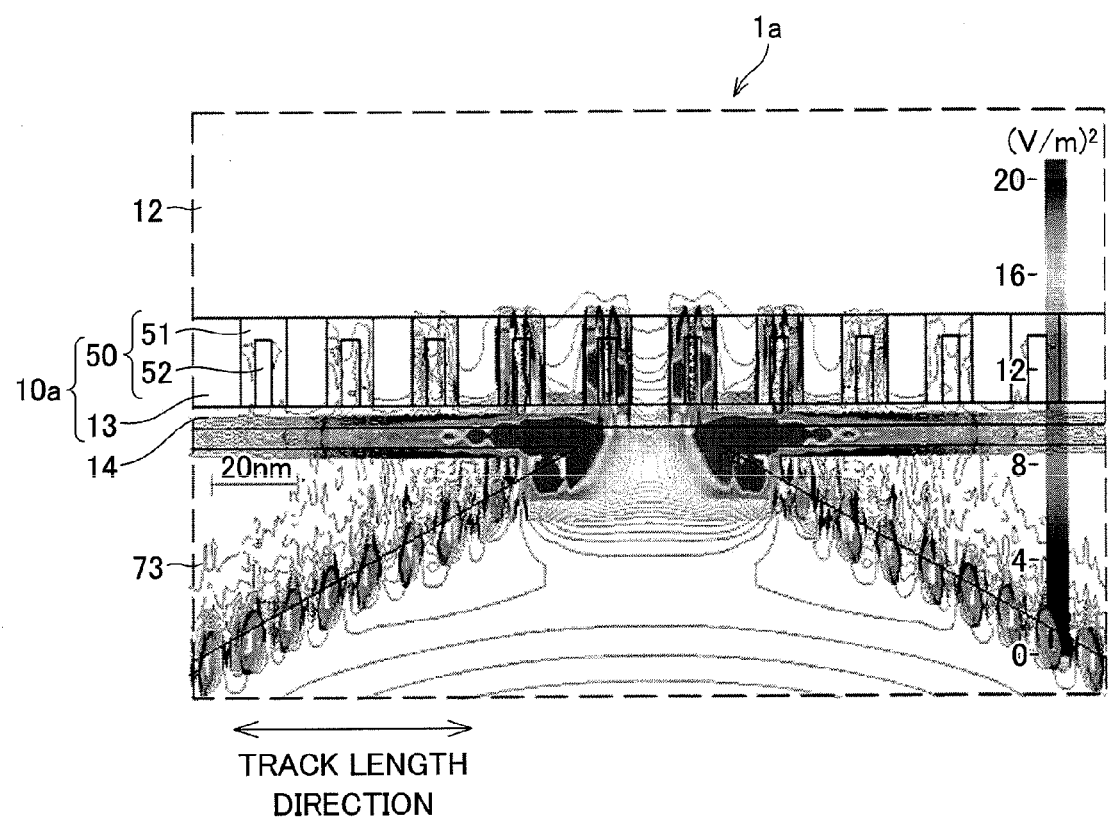

FIG. 11 shows field intensity measured in Example 1.

Figure 12:
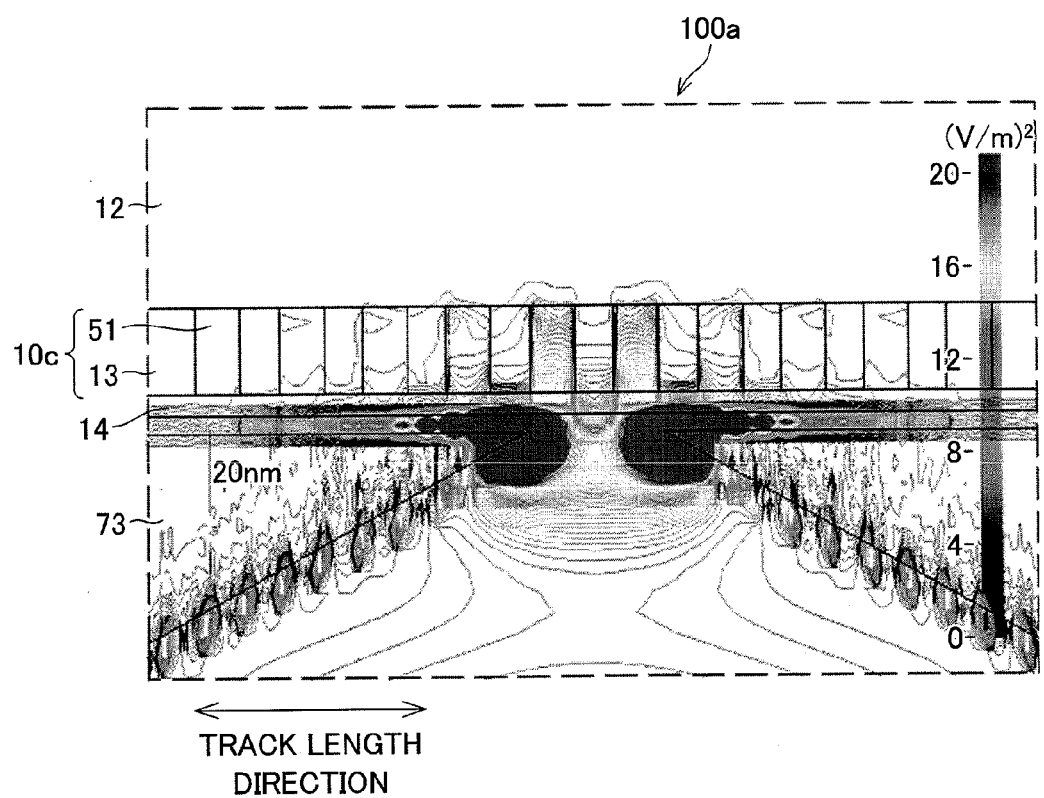

FIG. 12 shows field intensity measured in Comparative Example 1.

Figure 13:
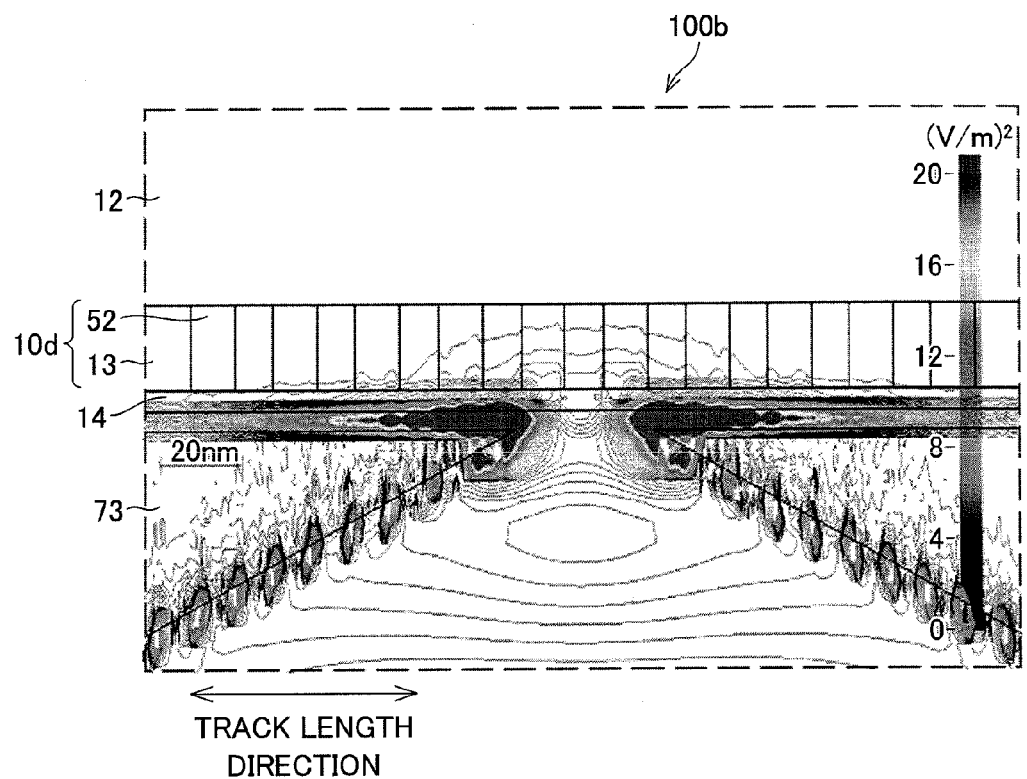

FIG. 13 shows field intensity measured in Comparative Example 2.

Figure 14:
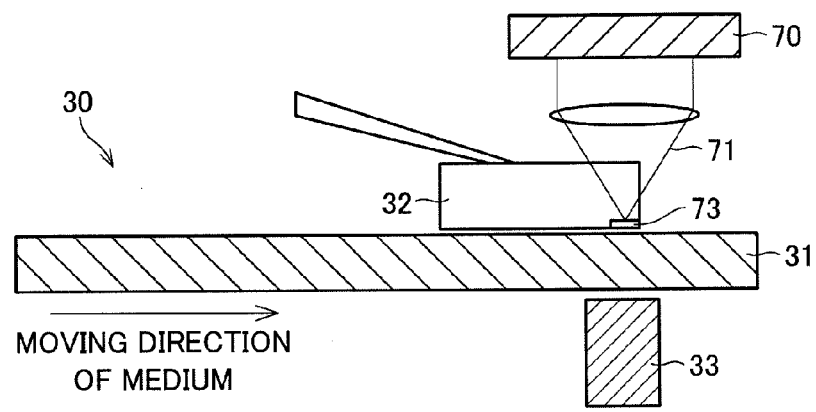

FIG. 14 is a block diagram illustrating a magnetic recording apparatus used in Example 2.

Figure 15:
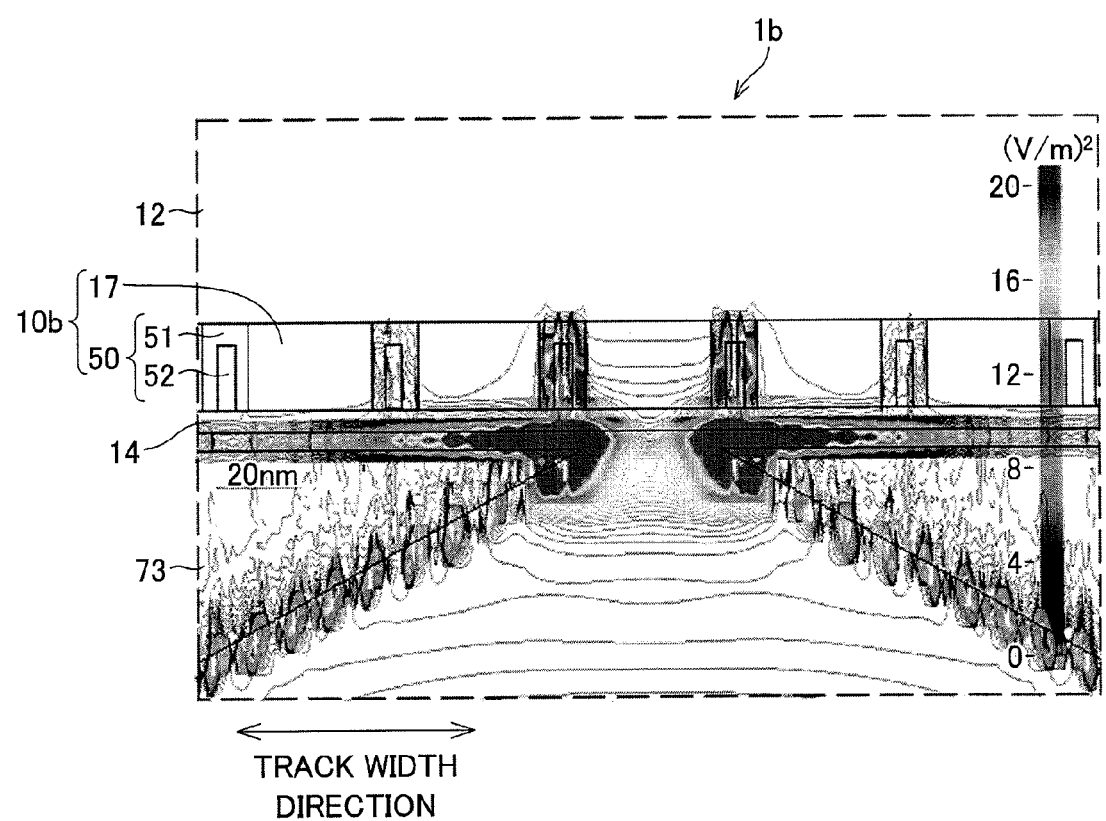

FIG. 15 shows field intensity measured in Example 3.

Figure 16:
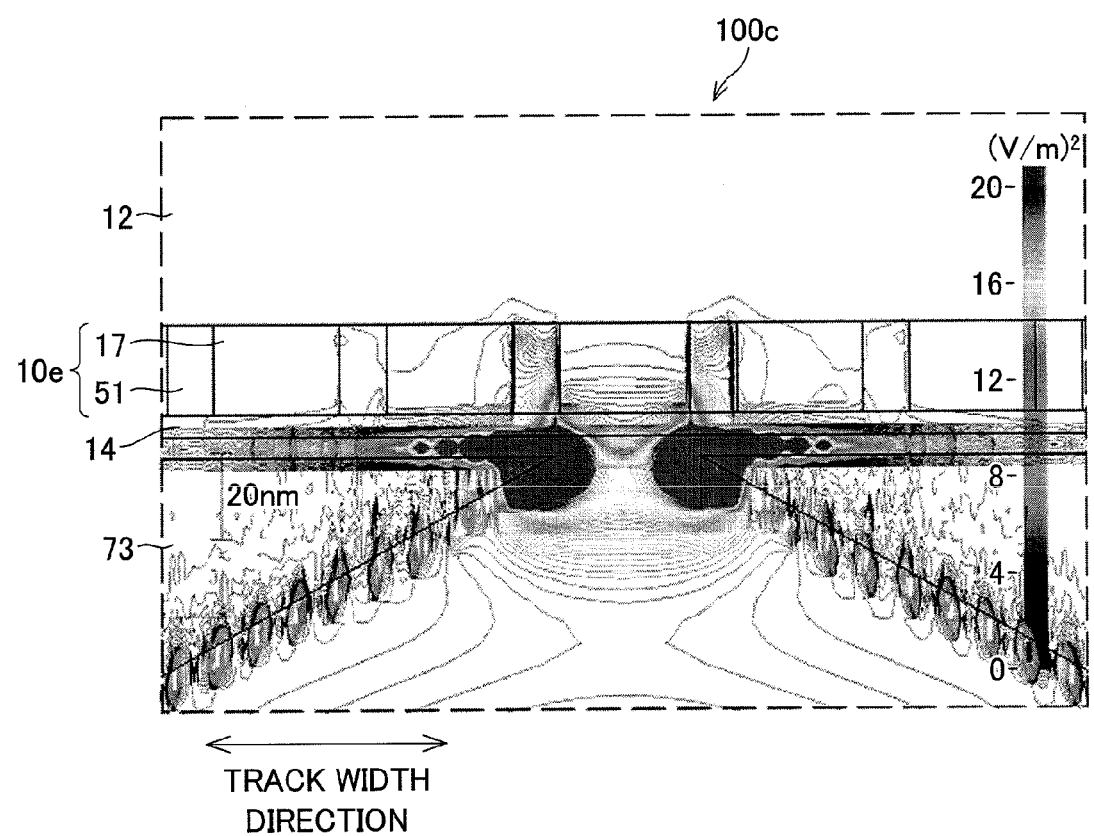

FIG. 16 shows field intensity measured in Comparative Example 3.

Figure 17:
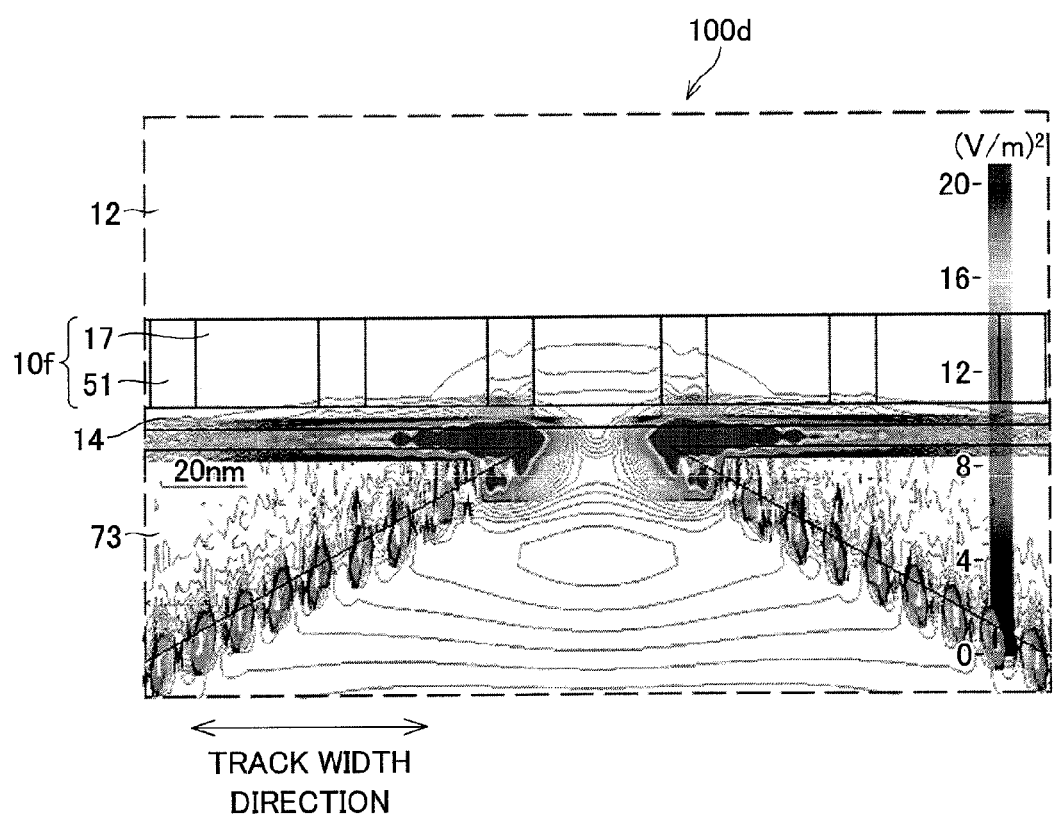

FIG. 17 shows field intensity measured in Comparative Example 4.

REFERENCE NUMERALS

1a Magnetic recording medium
1b Magnetic recording medium
10a Recording layer
10b Recording layer
11 Substrate
12 Soft magnetic foundation layer (soft magnetic body)
13 Magnetic dots (magnetic body)
14 Protecting layer
15 Antioxidant film
17 Magnetic track (magnetic body)
30 Magnetic recording apparatus
31 Magnetic disk (magnetic recording medium)
50 Separator layer (separator)
51 Dielectric body layer (first dielectric body layer, second dielectric body layer)
52 Metallic body layer (metallic body)
70 Laser light source
71 Laser light
72 Near-field light
73 Near-field light generating section (near-field light generating means)
500 Magnetic recording/reproducing apparatus
501 Magnetic recording/reproducing head
502 Slider
503 Magnetic disk (magnetic recording medium)
506 Spindle
507 Suspension arm
508 Voice coil motor
509 Control section

DESCRIPTION OF EMBODIMENTS

Embodiment 1

An embodiment of a magnetic recording medium according to the present invention will be described below with reference to FIGS. 1 through 5.

(Arrangement of Magnetic Recording Medium 1a)

Figure 1:
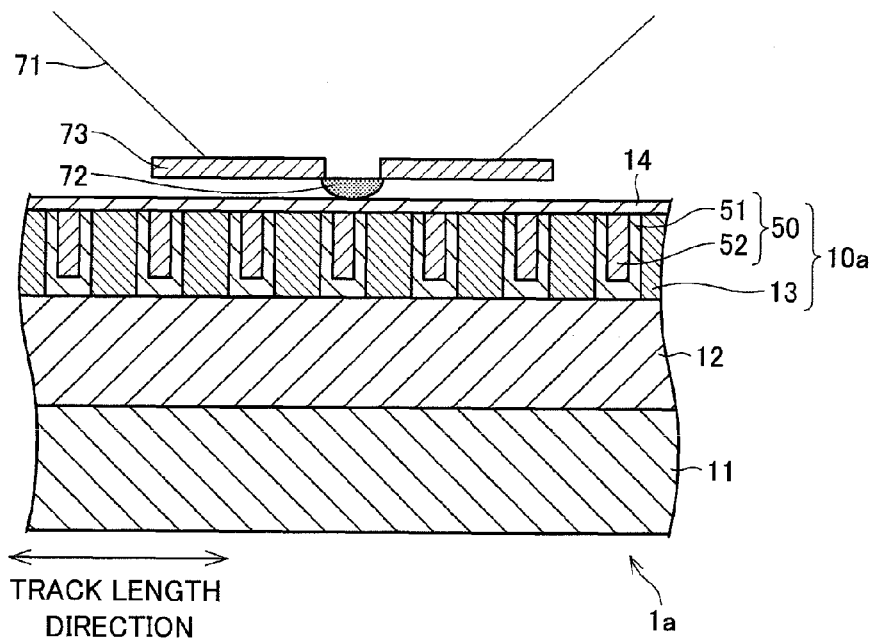
FIG. 1 is a schematic cross-sectional view of a magnetic recording medium according to Embodiment 1.
Figure 2:
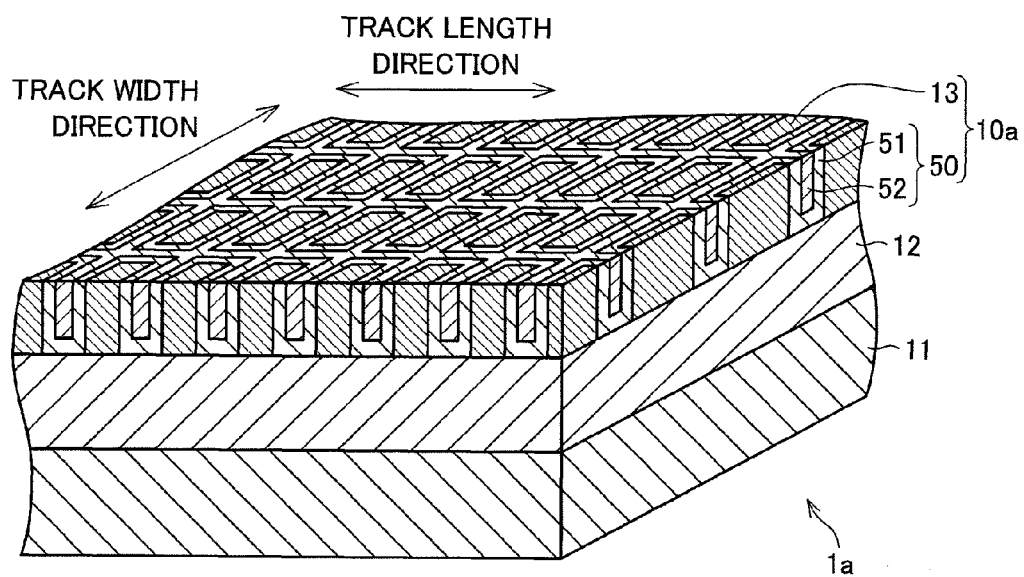
FIG. 2 is a schematic perspective view of the magnetic recording medium according to Embodiment 1.

The following describes an arrangement of a magnetic recording medium 1a with reference to FIGS. 1 and 2. FIG. 1 is a schematic cross-sectional view of the magnetic recording medium 1a in a track length direction. FIG. 2 is a schematic perspective view of the magnetic recording medium 1a.

As illustrated in FIGS. 1 and 2, the magnetic recording medium 1a includes a recording layer 10a, a substrate 11, a soft magnetic foundation layer 12, and a protecting layer 14. FIG. 2 omits the protecting layer 14 in order to clarify features of the magnetic recording medium 1a.

In the magnetic recording medium 1a, as illustrated in FIG. 1, the soft magnetic foundation layer 12 is provided on the substrate 11; the recording layer 10a is provided on the soft magnetic foundation layer 12; the protecting layer 14 is provided on the recording layer 10a.

(Arrangement of Recording Layer 10a)

The recording layer 10a includes magnetic dots 13 and separator layers 50. As illustrated in FIGS. 1 and 2, the separator layers 50 and the magnetic dots 13 are alternately provided in the track length direction and in a track width direction, such that a magnetic connection between two magnetic dots 13 is disconnected by a separator layer 50.

Further, as illustrated in FIG. 2, the magnetic dots 13 of the magnetic recording medium 1a are separated from one another by the separator layers 50 in both the track length direction and the track width direction. That is, the magnetic recording medium 1a adopts an arrangement of a so-called patterned medium. The magnetic dots 13 and the separator layers 50 of the recording layer 10a are described later in detail.

(Substrate 11)

The substrate 11 can be realized by use of a metallic substrate, an oxide substrate, a nitride substrate, a resin substrate, or the like. Specific examples of such a substrate are a silica dioxide substrate, an aluminum substrate coated with nickel phosphide, and a polycarbonate substrate. The substrate 11 is not particularly limited in its material and shape, provided that the substrate 11 has a flat surface on which the recording layer 10a, the soft magnetic foundation layer 12, and the protecting layer 14 are stacked and that the recording layer 10a, the soft magnetic foundation layer 12, and the protecting layer 14, which are thus stacked on the surface of the substrate 11, can be supported without being deformed.

(Soft Magnetic Foundation Layer 12)

The soft magnetic foundation layer 12 is a layer for, by enhancing a magnetic field perpendicular to the surface of the substrate 11, aiding recording carried out by application of an external magnetic field to a magnetic dot 13. The soft magnetic foundation layer 12 is also referred to as "SUL (Soft Underlayer)". The soft magnetic foundation layer 12 is formed from, for example, a nickel-iron alloy, a nickel-iron-tantalum alloy, a cobalt-zirconium alloy, or a soft magnetic body containing any one of the alloys as its main component.

As illustrated in FIG. 1, the soft magnetic foundation layer 12 is provided so as to have contact with the magnetic dots 13. This makes it possible to enhance a magnetic field applied from the soft magnetic foundation layer 12 to the magnetic dots 13, thus aiding recording to the magnetic dots 13 by exchange coupling force.

(Protecting Layer 14)

The protecting layer 14 is provided to protect the magnetic dots 13. The protecting layer 14 is realized by a flat, smooth, and hard thin film typified by diamond-like carbon (DLC). In addition, the protecting layer 14 may have a lubricating layer provided thereon for preventing damage of the magnetic recording medium 1a caused by contact with a recording head.

(Magnetic Dots 13)

Each of the magnetic dots 13 of the recording layer 10a is a magnetic body in which to record and store magnetic information. It is preferable that the magnetic dot 13 be made of a ferromagnetic material, a ferrimagnetic material, or a laminated film of the materials, and be a perpendicularly-magnetized film having magnetization perpendicular to the surface of the substrate. A specific example of such a material is a cobalt-chrome-platinum alloy, a cobalt-chrome-platinum-boron alloy, a cobalt-platinum alloy, an iron-platinum alloy, an iron-nickel-platinum alloy, a terbium-iron alloy, a terbium-iron-cobalt alloy, a dysprosium-iron alloy, a dysprosium-iron-cobalt alloy, or a ferromagnetic or ferrimagnetic body containing any one of the alloys as its main component.

(Arrangement of Separator Layers 50)

As illustrated in FIGS. 1 and 2, each of the separator layers 50 is a layered body in which two dielectric body layers (first dielectric body layers) 51 and a metallic body layer 52 are alternately stacked in an in-plane direction of the substrate 11. The respective numbers of metallic body layers 52 and dielectric body layers 51 that constitutes a separator layer 50 are not particularly limited, provided that two dielectric body layers 51 are provided on both sides of a layered body so as to have contact with two magnetic dots 13, respectively, and that the respective sizes of dielectric body layers 51 and metallic body layers 52 fall within respective ranges described below.

(Dielectric Body Layer 51)

Each of the dielectric body layers 51 is a nonmagnetic layer for separating a magnetic connection between two magnetic dots 13. The dielectric body layers 51 can be made of a transparent dielectric material such as silica dioxide, silicon nitride, aluminum oxide, aluminum nitride, magnesium oxide, magnesium fluoride, or gallium nitride.

(Metallic Layers 52)

Each of the metallic body layers 52 is sandwiched between two dielectric body layers 51. The metallic body layer 52 is a member for propagating, through an interface between the metallic body layer 52 and a dielectric body layer 51, plasmons converted from near-field light emitted during recording. From a viewpoint of improvement of efficiency in plasmon generation, it is preferable that the metallic body layers 52 be made of gold, silver, aluminum, platinum, or an alloy containing any one of the metals as its main component. Each of the metals is high in efficiency of plasmon propagation. As such, the use of any one of the metals as the metallic body layer 52 makes it possible to propagate plasmons efficiently and uniformly.

(Generation of Near-Field Light 72)

As illustrated in FIG. 1, near-field light 72 is generated by a near-field light generating section 73. Specifically, laser light 71 emitted from the outside of the magnetic recording medium 1a passes through the near-field light generating section 73, located on an optical path of the laser light 71 between a light source of the laser light 71 and the magnetic recording medium 1a, with the result that the near-field light 72 is generated. The magnetic recording medium 1a is irradiated with the near-field light 72 thus generated.

The near-field light generating section 73 can be realized by its conventional counterpart. Specific examples are a metal plate and a metal thin film each having a minute aperture smaller than the wavelength of laser light emitted from a laser light source, an optical waveguide, an optical probe, a scatterer, an electromagnetic field generating element, etc.

(Method for Manufacturing Magnetic Recording Medium 1a)

Figure 3:
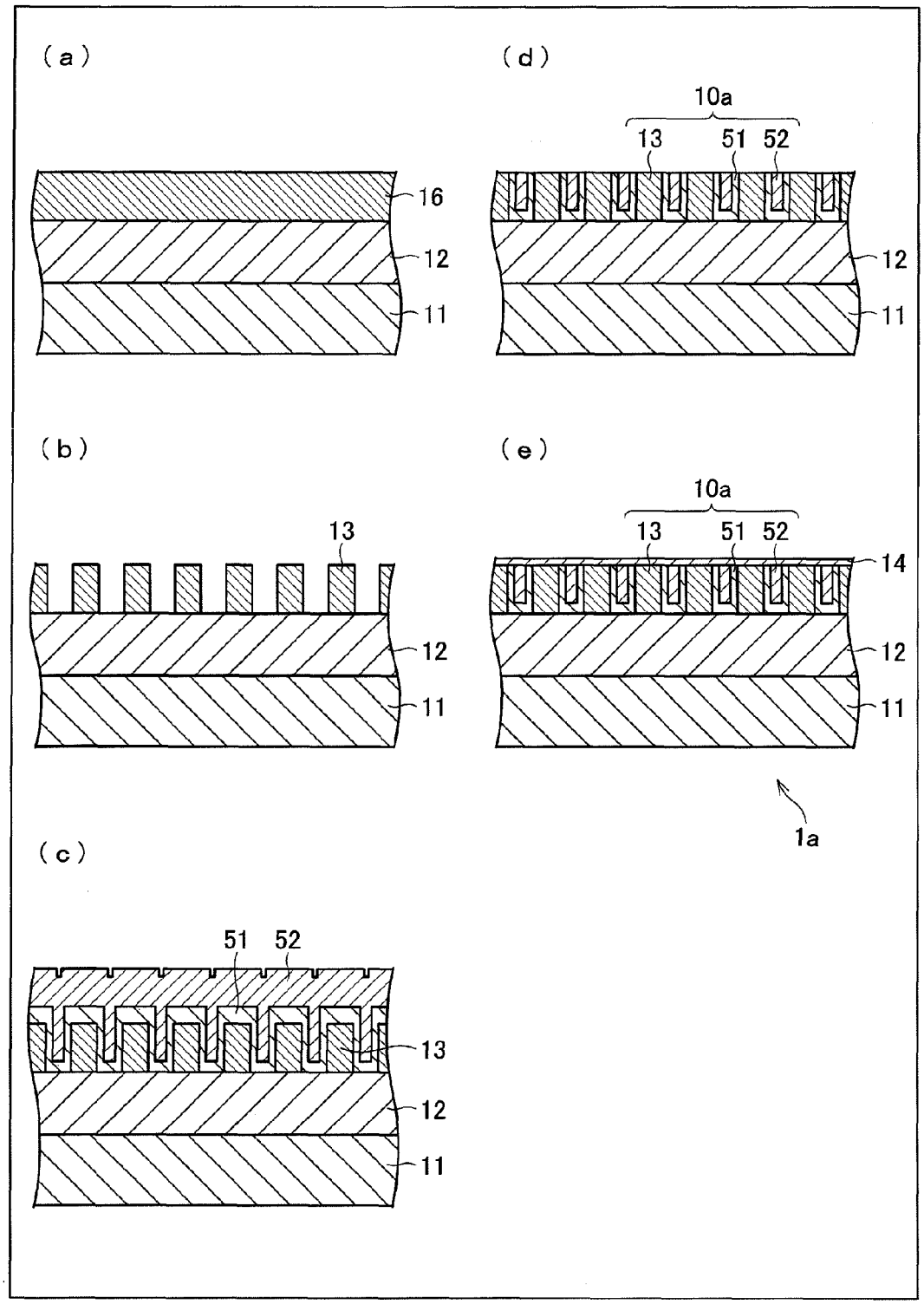
FIG. 3 illustrates a method for manufacturing a magnetic recording medium according to the present invention. (a) of FIG. 3 illustrates a step of forming a soft magnetic body layer and a magnetic body layer on a substrate. (b) of FIG. 3 illustrates a step of forming magnetic dots from the magnetic body layer. (c) of FIG. 3 illustrates a step of forming a dielectric body layer and a metallic body layer. (d) of FIG. 3 illustrates a step of polishing a surface of the magnetic recording medium. (e) of FIG. 3 illustrates a step of forming a protecting layer.

The following describes a method for manufacturing a magnetic recording medium 1a, with reference to (a) through (e) of FIG. 3. The following takes as an example an arrangement in which one metallic body layer 52 is provided between two magnetic dots 13. However, the present invention is not limited to this.

FIG. 3 illustrates the method for manufacturing a magnetic recording medium 1a. (a) of FIG. 3 illustrates a step of forming a soft magnetic foundation layer 12 and a magnetic body layer 16 on a substrate 11. (b) of FIG. 3 illustrates a step of forming magnetic dots 13 from the magnetic body layer 16. (c) of FIG. 3 illustrates a step of forming a dielectric body layer 51 and a metallic body layer 52. (d) of FIG. 3 illustrates a step of polishing a surface of the magnetic recording medium 1a. (e) of FIG. 3 illustrates a step of forming a protecting layer 14.

As illustrated in (a) of FIG. 3, the soft magnetic foundation layer 12 is formed on the substrate 11. For example, the substrate 11 is made of silicon dioxide, and the soft magnetic foundation layer 12 is made of a cobalt-zirconium-niobium alloy having a film thickness of 400 nm. Then, the magnetic body layer 16, which is formed into the magnetic dots 13 later, is formed on the soft magnetic foundation layer 12. The magnetic body layer 16 is made, for example, of a cobalt-platinum alloy having a film thickness of 20 nm. It is possible to adopt sputtering, vapor deposition, or electroforming to form the soft magnetic foundation layer 12 and the magnetic body layer 16.

As illustrated in (b) of FIG. 3, the magnetic dots 13 are then carved from the magnetic body layer 16 by FIB (Focused Ion Beam). In order to obtain a magnetic recording medium 1a having an area density of approximately 1 Tbit/inch$^2$, for example, each magnetic dot 13 is sized to be 10 nm in the track length direction and 30 nm in the track width direction and magnetic dots 13 are placed at intervals of 10 nm in both the track length direction and the track width direction.

In the step illustrated in (b) of FIG. 3, it is possible to adopt a method for forming the magnetic dots 13 by etching the magnetic body layer 16 with the magnetic body layer 16 masked by a resist having a dotted pattern made by electron lithography. Alternatively, it is possible to adopt a method utilizing self-organizing molecules or a method utilizing a masking material formed into an island shape. It is possible to adopt, for example, ion milling or reactive ion etching (RIE) as a method for etching the magnetic body layer 16.

Then, as illustrated in (c) of FIG. 3, the dielectric body layer 51 and the metallic body layer 52 are formed over the soft magnetic foundation layer 12 and the magnetic dots 13. For example, the dielectric body layer 51 is made of silicon dioxide, and the metallic body layer 52 is made of gold. In (c) of FIG. 3, the dielectric body layer 51 is firstly formed so as to have a film thickness of approximately 3 nm from each side wall of a magnetic dot 13. Then, the metallic body layer 52 is formed so as to fill a gap between two magnetic dots 13 after the dielectric body layer 51 is formed. Thus, the recording layer 10*a* is formed. It is possible to adopt sputtering or vapor deposition to form the dielectric body layer 51 and the metallic body layer 52. The metallic body layer 52 can be formed by electroforming in a case where it is difficult to form the metallic body layer 52 by sputtering or vapor evaporation for the reason that an area in which the metallic body layer 52 is fitted has a high aspect ratio.

As illustrated in (d) of FIG. 3, then, the metallic body layer 52 is polished by CMP (Chemical Mechanical Polishing) until the magnetic dots 13 appear on a surface of the recording layer 10*a*. As illustrated in (e) of FIG. 3, then, the protecting layer 14 is formed on the recording layer 10*a*, and a lubricating layer is formed by coating. The magnetic recording medium 1*a* is thus completed. The protecting layer 14 is, for example, a DLC having a film thickness of 4 nm.

In the method for manufacturing a magnetic recording medium 1*a*, as illustrated in (a) through (e) of FIG. 4, the magnetic body layer 16 may have an antioxidant film 15 provided thereon. The antioxidant film 15 is a film for preventing oxidation of the magnetic body layer 16. The antioxidant film 15 can be made, for example, of a dielectric material such as silicon dioxide, silicon nitride, aluminum oxide, aluminum nitride, magnesium oxide, magnesium fluoride, or gallium nitride.

FIG. 4 illustrates a modification of the method for manufacturing a magnetic recording medium 1*a*. (a) of FIG. 4 illustrates a step of forming a soft magnetic foundation layer 12, a magnetic body layer 16, and an antioxidant layer 15 on a substrate 11. (b) of FIG. 4 illustrates a step of forming magnetic dots 13 from the magnetic body layer 16. (c) of FIG. 4 illustrates a step of forming a dielectric body layer 51 and a metallic body layer 52. (d) of FIG. 4 illustrates a step of polishing a surface of the magnetic recording medium 1*a*. (e) of FIG. 4 illustrates a step of forming a protecting layer 14.

A manufacturing method illustrated in (a) through (e) of FIG. 4 is the same as the manufacturing method illustrated in (a) through (e) of FIG. 3, except that the modified manufacturing method includes, in (a) of FIG. 4, the step of forming the antioxidant film 15 on the magnetic body layer 16. As such, the following omits descriptions of (a) through (e) of FIG. 4. In (d) of FIG. 4, however, the step of polishing the metallic body layer 52 by CMP is halted upon appearance of the antioxidant film 15 on the surface of the magnetic recording medium 1*a*. Accordingly, the magnetic dots 13 are always protected by the antioxidant film 15 during the manufacture of the magnetic recording medium 1*a*. As such, the manufacturing method illustrated in (a) through (e) of FIG. 4 enhances an effect of preventing oxidation of the surface of the magnetic dots 13 caused in the steps of manufacturing the magnetic recording medium 1*a*, as compared to the manufacturing method illustrated in (a) through (e) of FIG. 3.

The manufacturing method illustrated in (a) through (e) of FIG. 4 can be suitably adopted in a case where the magnetic body layer 16 is easily oxidized as is the case with a magnetic body containing a rare-earth metal.

(Method for Recording Information on Magnetic Recording Medium 1*a*)

The following describes a method for recording information on a magnetic recording medium 1*a* by use of near-field light.

As described above, the near-field light 72 is generated by passage of the laser light 71 through the near-field light generating section 73. The magnetic recording medium 1*a* is irradiated with the near-field light 72 thus generated, whereby a magnetic dot 13 in an area thus irradiated is heated. A mechanism by which the irradiation of the near-field light 72 heats a magnetic dot 13 is described later in detail. Heating the magnetic dot 13 causes the temperature of the magnetic dot 13 to become close to the Curie temperature. This decreases the coercivity of the magnetic dot 13. Then, an external magnetic field exceeding the coercivity of the magnetic dot 13 in the area thus heated is applied to the magnetic recording medium 1*a*. This makes it possible to reverse a magnetic field of the magnetic dot 13. In the optically-assisted recording method utilizing near-field light 72, thus, recording is performed only on a heated magnetic dot 13. This makes it possible to realize recording higher in density, as compared to recording utilizing magnetism only.

(Functions and Effects of Dielectric Body Layer 51 and Metallic Body Layer 52)

The following describes the functions and effects of a dielectric body layer 51 and a metallic body layer 52 in a case where a magnetic dot 13 is heated by the irradiation of the near-field light 72.

As described above, a separator layer 50 includes two dielectric body layers 51 and a metallic body layer 52. The two dielectric body layers 51 and the metallic body layer 52 are alternately stacked in the in-plane direction of the substrate 11. Plasmons converted from the near-field light 72 by the irradiation of the near-field light 72 propagate through an interface between a dielectric body layer 51 and a metallic body layer 52. "Plasmon" refers to a sort of dilatational wave of electrons that is caused at a metal-dielectric body interface. Plasmons converted from near-field light propagate through an interface between a metal and a dielectric body and become localized plasmons, which are localized at the interface. This causes a concentration of an electric field, whereby the localized plasmons is converted into heat.

In the magnetic recording medium 1*a*, two dielectric body layers 51 are provided on both sides of a magnetic dot 13, respectively, and two dielectric body layers 51 and a metallic body layer 52 are alternately stacked. Therefore, an intense concentration of an electric field is caused on each side of the magnetic dot 13. Plasmons are likely to propagate through a metal-dielectric body interface. As such, generated plasmons do not diffuse on the surface of the magnetic recording medium 1*a*. Such an interface of the magnetic recording medium 1*a* extends in a depth direction of the magnetic recording medium 1*a*. Therefore, plasmons propagate into the magnetic recording medium 1*a*. This causes a concentration of an electric field inside the magnetic recording medium 1*a*. Thus, the entire magnetic dot 13 can be heated.

This makes it possible to sufficiently heat the whole of a magnetic dot (magnetic body) 13 by a concentration of an electric field caused around the magnetic dot (magnetic body) 13 without enhancing the intensity of the near-field light 72 to be generated. This makes it unnecessary to increase the amount of power that is consumed by the light source for emitting the laser light 71 necessary for recording on the magnetic recording medium 1*a*.

Plasmons propagate even to a bottom surface of a metallic body layer 52 on the side of the soft magnetic foundation layer 12 in a case where a dielectric body (second dielectric body) 51 is further provided between the metallic body layer 52 and the soft magnetic foundation layer 12. This makes it possible to heat a magnetic dot 13 more effectively.

(Width and Thickness of Metallic Body Layer 52)

The length of a metallic body layer 52 in a direction parallel to the surface of the substrate 11 (hereinafter, referred to as "width") is preferably in a range from not less than 2 nm to not more than 30 nm. A width of 2 nm or more of a metallic body layer 52 makes it possible to cause a concentration of an electric field at an interface between the metallic body layer 52 and a dielectric body layer 51. An upper limit of the width of a metallic body layer 52 is not particularly limited, but is preferably not more than 30 nm, in consideration of the properties of a patterned medium that is used as a high-density magnetic recording medium having a problem of thermal fluctuation.

In addition, the length of a metallic body layer 52 in a direction perpendicular to the surface of the substrate 11 (hereinafter, referred to as "thickness") is preferably in a range from not less than 2 nm to not more than 70 nm. In a case where the thickness of a metallic body layer 52 is 2 nm or more, it is possible to cause a concentration of an electric field at an interface between the metallic body layer 52 and a dielectric body layer 51. An upper limit of the thickness of a metallic body layer 52 is not particularly limited. However, an extremely thick magnetic dot 13 can produce a magnetic domain wall therein. In addition, an extremely thick magnetic dot 13 can cause a noise since coherent magnetization reversal of the magnetic dot 13 does not occur. For this reason, it is preferable that the thickness of a magnetic dot 13 be not more than 70 nm. Accordingly, it is preferable that the thickness of a metallic body layer 52 be not more than 70 nm, too.

In a case where the metallic body layers 52 are made of gold or an alloy containing gold as its main component, it is possible to cause an intense concentration of an electric field by adopting as the light source a laser having a wavelength in a range from approximately 600 nm to 1 μm. In a case where the metallic body layers 52 are made of silver, aluminum, platinum, or an alloy containing any one of the metals as its main component, it is possible to cause an intense concentration of an electric field by adopting a short-wavelength laser having a wavelength of 600 nm or less.

(Width and Thickness of Dielectric Body Layer 51)

The width of a dielectric body layer 51 between a metallic body layer 52 and a magnetic dot 13 (hereinafter, referred to as "width") is preferably in a range from not less than 2 nm to not more than 30 nm. A width of 2 nm or more of a dielectric body layer 51 makes it possible to cause a concentration of an electric field at an interface between a metallic body layer 52 and the dielectric body layer 51. An upper limit of the width of a dielectric body layer 51 is not particularly limited. However, the width of a dielectric body layer 51 is preferably not more than 30 nm, in consideration of the properties of a patterned medium that is used as a high-density magnetic recording medium having a problem of thermal fluctuation.

The thickness of a dielectric body layer 51 is preferably in a range from not less than 2 nm to not more than 30 nm. A thickness of 2 nm or more of a dielectric body layer 51 makes it possible to cause a concentration of an electric field at an interface between a metallic body layer 52 and the dielectric body layer 51. An upper limit of the thickness of a dielectric body layer 51 is not particularly limited. However, the thickness of a dielectric body layer 51 is preferably not more than 30 nm, in consideration of the properties of a patterned medium that is used as a high-density magnetic recording medium having a problem of thermal fluctuation.

(Modification of Magnetic Recording Medium 1a)

FIGS. 5 through 7 illustrate a modification of the magnetic recording medium 1a. Each of FIGS. 5 through 7 is a schematic cross-sectional view of the modification of the magnetic recording medium 1a.

As illustrated in FIG. 5, the magnetic recording medium 1a can be in such a shape that the soft magnetic foundation layer 12 is partially gouged. It is possible to form such a shape by gouging as far as a part of the soft magnetic foundation layer 12 in the step of carving the magnetic dots 13 (see (b) of FIG. 3 or (b) of FIG. 4) in the steps of manufacturing the magnetic recording medium 1a, which are illustrated in (a) through (e) of FIG. 3 or (a) through (e) of FIG. 4.

As illustrated in FIGS. 6 and 7, the magnetic dots 13, the dielectric body layers 51, and the metallic body layers 52 each do not need to have a rectangular cross-sectional shape. That is, their respective cross-sectional shapes are not particularly limited, provided that: (i) a metallic body layer 52 and two dielectric body layers 51 are alternately stacked in a separator layer 50; (ii) both sides of a magnetic dot 13, in the in-plane direction of the substrate 11, have contact with two dielectric body layers 51, respectively; and (iii) a magnetic dot 13, a dielectric body layer 51, and a metallic body layer 52 have their respective widths and thicknesses as described above. As illustrated in FIG. 6, specifically, a metallic body layer 52 can be in such a shape that the width of the shape becomes narrower toward the inside of the magnetic recording medium 1a. In addition, as illustrated in FIG. 7, the width of a magnetic dot 13 can be made narrower toward the inside of the magnetic recording medium 1a, and the respective shapes of a dielectric body layer 51 and a metallic body layer 52 can be changed accordingly.

Embodiment 2

An embodiment of a magnetic recording medium according to the present invention will be described below with reference to FIGS. 8 through 9.

(Arrangement of Magnetic Recording Medium 1b)

The following describes an arrangement of a magnetic recording medium 1b with reference to FIGS. 8 and 9. Members that are the same as those of Embodiment 1 are given the same reference numerals and descriptions of the members are omitted.

FIG. 8 is a schematic cross-sectional view of the magnetic recording medium 1b. FIG. 9 is a schematic perspective view of the magnetic recording medium 1b. FIG. 2 omits a protecting layer 14 in order to clarify features of the present embodiment, as is the case with Embodiment 1.

As illustrated in FIGS. 8 and 9, a recording layer 10b includes magnetic tracks 17 and separator layers 50. The magnetic tracks 17 are separated from one another by the separator layers 50. This is an arrangement of a so-called discrete medium, in which arrangement magnetic tracks are separated from one another by separators.

(Magnetic Tracks 17)

Each of the magnetic tracks 17 is a magnetic body in which to record and store magnetic information. It is preferable that the magnetic track 17 be made of a ferromagnetic material, a ferrimagnetic material, or a laminated film of the materials, and be a perpendicularly-magnetized film having magnetization perpendicular to the surface of the substrate. A specific example of such a material is a cobalt-chrome-platinum alloy, a cobalt-chrome-platinum-boron alloy, a cobalt-platinum alloy, an iron-platinum alloy, an iron-nickel-platinum alloy, a terbium-iron alloy, a terbium-iron-cobalt alloy, a dysprosium-iron alloy, a dysprosium-iron-cobalt alloy, or a ferromagnetic or ferrimagnetic body containing any one of the alloys as its main component.

(Method for Manufacturing Magnetic Recording Medium 1b)

The following describes a method for manufacturing a magnetic recording medium 1b. The following omits descriptions of the same steps as those of the method for manufacturing a magnetic recording medium 1a. Accordingly, the following describes only the step of forming the magnetic tracks 17, which step is illustrated in (a) of FIG. 3 or (a) of FIG. 4. In the step illustrated in (a) of FIG. 3 or (a) of FIG. 4, the magnetic body layer 16 is processed in both the track length direction and the track width direction, thereby forming the magnetic dots 13 of the magnetic recording medium 1a. In contrast, the magnetic tracks 17 of the magnetic recording medium 1b are carved only in the track width direction.

In order to obtain a magnetic recording medium 1b having an area density of approximately 1 Tbit/inch$^2$, for example, each magnetic track 17 is arranged to have a width of 30 nm, and magnetic tracks 17 are placed at intervals of 10 nm.

(Method for Recording Information on Magnetic Recording Medium 1b)

The following describes a method for recording information on a magnetic recording medium 1b by use of near-field light.

In the present embodiment, as is the case with Embodiment 1, near-field light 72 is generated by passage of laser light 71 through a near-field light generating section 73. The magnetic recording medium 1b is irradiated with the near-field light 72 thus generated, whereby a magnetic track 17 in an area thus irradiated is heated. Heating the magnetic track 17 causes the temperature of the magnetic track 17 to become close to the Curie temperature. This decreases the coercivity of the magnetic track 17. Then, an external magnetic field exceeding the coercivity of the magnetic track 17 in the area thus heated is applied to the magnetic recording medium 1b. This makes it possible to reverse a magnetic field of a magnetic body forming the magnetic track 17. In the optically-assisted recording method utilizing the near-field light 72, thus, recording is performed only on a magnetic body in a heated area. This makes it possible to realize recording higher in density, as compared to recording utilizing magnetism only.

(Functions and Effects of Dielectric Body Layer 51 and Metallic Body Layer 52)

The following describes the functions and effects of a dielectric body layer 51 and a metallic body layer 52 in a case where a magnetic track 17 is heated by the irradiation of the near-field light 72.

As described above, a separator layer 50 includes two dielectric body layers 51 and a metallic body layer 52. The two dielectric body layers 51 and the metallic body layer 52 are alternately stacked in the in-plane direction of the substrate 11. Plasmons converted from the near-field light 72 by the irradiation of the near-field light 72 propagate through an interface between a dielectric body layer 51 and a metallic body layer 52 of a separator layer 50. "Plasmon" refers to a sort of dilatational wave of electrons that is caused at a metal-dielectric body interface. Plasmons converted from near-field light propagate through an interface between a metal and a dielectric body and become localized plasmons, which are localized at the interface. This causes a concentration of an electric field, whereby the localized plasmons is converted into heat.

In the magnetic recording medium 1b, two dielectric body layers 51 are provided on both sides of a magnetic track 17, respectively, and two dielectric body layers 51 and a metallic body layer 52 are alternately stacked. Therefore, an intense concentration of an electric field is caused on each side of the magnetic dot 17. Plasmons are likely to propagate through a metal-dielectric body interface. As such, generated plasmons do not diffuse on the surface of the magnetic recording medium 1b. Such an interface of the magnetic recording medium 1b extends in a depth direction of the magnetic recording medium 1b. Therefore, plasmons propagate into the magnetic recording medium 1b. This causes a concentration of an electric field inside the magnetic recording medium 1b. Thus, the entire magnetic track 17 can be heated.

Thus, the magnetic recording medium 1b makes it possible to sufficiently heat the whole of a magnetic track 17 by causing a concentration of an electric field caused around the magnetic track 17 without enhancing the intensity of the near-field light 72 to be generated. This makes it unnecessary to increase the amount of power that is consumed by the light source for emitting the laser light 71 necessary for recording on the magnetic recording medium 1b.

Plasmons propagate even to a bottom surface of a metallic body layer 52 on the side of the soft magnetic foundation layer 12 in a case where a dielectric body 51 is further provided between the metallic body layer 52 and the soft magnetic foundation layer 12. This makes it possible to heat a magnetic track 17 more effectively.

(Width and Thickness of Metallic Body Layer 52)

The width of a metallic body layer 52 is preferably in a range from not less than 2 nm to not more than 50 nm. A width of 2 nm or more of a metallic body layer 52 makes it possible to cause a concentration of an electric field at an interface between the metallic body layer 52 and a dielectric body layer 51. An upper limit of the width of a metallic body layer 52 is not particularly limited, but is preferably not more than 50 nm, in consideration of the properties of a patterned medium that is used as a high-density magnetic recording medium having a problem of thermal fluctuation.

The thickness of a metallic body layer 52 is preferably in a range from not less than 2 nm to not more than 70 nm. A thickness of 2 nm or more of a metallic body layer 52 makes it possible to cause a concentration of an electric field at an interface between the metallic body layer and a dielectric body layer 51. An upper limit of the thickness of a metallic body layer 52 is not particularly limited. However, an extremely thick magnetic track 17 can produce a magnetic domain wall therein. In addition, an extremely thick magnetic track 17 can cause a noise since coherent magnetization reversal of the magnetic track 17 does not occur. For this reason, it is preferable that the thickness of a magnetic track 17 be not more than 70 nm. Accordingly, it is preferable that the thickness of a metallic body layer 52 be not more than 70 nm, too.

In a case where the metallic body layers 52 are made of gold or an alloy containing gold as its main component, it is possible to cause an intense concentration of an electric field by adopting as the light source a laser having a wavelength in a range from approximately 600 nm to 1 µm. In a case where the metallic body layer 52 are made of silver, aluminum, platinum, or an alloy containing any one of the metals as its main component, it is possible to cause an intense concentration of an electric field by adopting as the light source a short-wavelength laser having a wavelength of 600 nm or less.

(Width and Thickness of Dielectric Body Layer 51)

The width and thickness of a dielectric body layer 51 are each preferably in a range from not less than 2 nm to not more than 30 nm. A width and thickness of 2 nm or more of a dielectric body layer 51 make it possible to cause a concentration of an electric field at an interface between a metallic body layer 52 and the dielectric body layer 51. Respective upper limits of the width and thickness of a dielectric body layer 51 are not particularly limited. However, the width and thickness of a dielectric body layer 51 are each preferably not more than 30 nm, in consideration of the properties of a patterned medium that is used as a high-density magnetic recording medium having a problem of thermal fluctuation.

(Modification of Magnetic Recording Medium 1b)

The magnetic recording medium 1b can be in such a shape that the soft magnetic foundation layer 12 is partially gouged, as is the case with Embodiment 1. It is possible to form such a shape by gouging as far as a part of the soft magnetic foundation layer 12 in carving the magnetic tracks 17.

In the magnetic recording medium 1b, as is the case with Embodiment 1, the magnetic tracks 17, the dielectric body layers 51, and the metallic body layers 52 each do not need to have a rectangular cross-sectional shape. That is, their respective cross-sectional shapes are not particularly limited, provided that: (i) a metallic body layer 52 and two dielectric body layers 51 are alternately stacked in a separator layer 50; (ii) both sides, in the in-plane direction of the substrate 11, of a magnetic track 17 have contact with two dielectric body layers 51, respectively; and (iii) a magnetic track 17, a dielectric body layer 51, and a metallic body layer 52 have their respective widths and thicknesses as described above. As illustrated in FIG. 6, specifically, a metallic body layer 52 can be in such a shape that the width of the shape becomes narrower toward the inside of the magnetic recording medium 1b. In addition, as illustrated in FIG. 7, the width of a magnetic track 17 can be narrower toward the inside of the magnetic recording medium 1b, and the respective shapes of a dielectric body layer 51 and a metallic body layer 52 can be changed accordingly.

Embodiment 3

The following describes, as Embodiment 3, a magnetic recording/reproducing apparatus utilizing a magnetic recording medium according to Embodiments 1 and 2.

(Magnetic Recording/Reproducing Apparatus 500)

The following describes an arrangement of a magnetic recording/reproducing apparatus 500 with reference to FIG. 10. Members that are the same as those of the first or second embodiment are given the same reference numerals and descriptions of the members are omitted. The following deals with a case where the magnetic recording medium 1a of Embodiment 1 and the magnetic recording medium 1b of Embodiment are each used as a magnetic disk.

FIG. 10 is a block diagram illustrating an arrangement of a main part of the magnetic recording/reproducing apparatus 500.

The magnetic recording/reproducing apparatus 500 includes a magnetic recording/reproducing head 501, a slider 502, a magnetic disk (magnetic recording medium) 503, a spindle 506, a suspension arm 507, a voice coil motor 508, and a control section 509.

The spindle 506 drives the magnetic disk 503 to rotate. The slider 502 is supported by the suspension arm 507. The suspension arm 507 is driven by the voice coil motor 508 on the magnetic disk 503. The spindle 506, the suspension arm 507, and the voice coil motor 508 can be realized by their conventional counterparts. The following describes the magnetic recording/reproducing head 501 and the control section 509 in detail.

(Magnetic Recording/Reproducing Head 501)

The magnetic recording/reproducing head 501 is provided to the slider 502. The magnetic recording/reproducing head 501 carries out by the optically-assisted recording method at least either information recording or information reproduction on/from a magnetic recording medium.

The following describes concrete operation of the magnetic recording/reproducing head 501. First, the spindle 506 rotates to rotate the magnetic disk 503, thereby generating airflow. The slider 502 floats approximately 5 to 10 μm above the magnetic disk 503 by use of the airflow thus generated. Then, the magnetic recording/reproducing head 501, provided at a tip of the slider 502 thus floating, irradiates the magnetic disk with an optical beam and applies a recording magnetic field to the magnetic disk 503. Thus, information is recorded on the magnetic disk 503. On the other hand, information is reproduced in such a manner that a magnetic field detecting section (not illustrated) provided to the magnetic recording/reproducing head 501 detects a leakage magnetic field from the magnetic disk 503.

The magnetic recording/reproducing head 501 and the slider 502 having the magnetic recording/reproducing head 501 can be realized by their conventional counterparts. The magnetic recording/reproducing head 501 is not particularly limited, provided that: the magnetic recording/reproducing head 501 (i) includes a near-field light generating section 73, a light source (not illustrated), and a magnetic field generation source (not illustrated); (ii) the magnetic recording/reproducing head 501 is capable of irradiating the magnetic disk 503 with near-field light and applying a magnetic field to the magnetic disk 503; and (iii) the magnetic recording/reproducing head 501 includes the magnetic field detecting section for detecting a leakage magnetic field from the magnetic disk 503. The slider 502 may be realized by a slider for use in a conventional hard disk apparatus. The magnetic field detecting section can be realized, for example, by a GMR (Giant Magneto Resistance) element or a TMR (Tunneling Magneto Resistance) element. The light source and the magnetic field generation source can be realized by their conventional counterparts. The near-field light generating section 73 is as described above in Embodiment 1.

The light source does not need to be provided to the magnetic recording/reproducing head 501, provided that the near-field light generating section 73 is irradiated with laser light. For example, the light source can be provided to the suspension arm 507.

(Control Section 509)

The control section 509 serves to control the operation of the slider 502, the spindle 506, the suspension arm 507, and the voice coil motor 508. As illustrated in FIG. 10, the control section 509 includes a rotary drive control section 510, a signal processing section 511, an output control section 512, and a recording section 513.

The rotary drive control section 510 controls the rotary drive of the spindle 506. A method for controlling the rotary drive can be realized, for example, by (i) CAV (Constant Angular Velocity), in which the rotation speed is maintained constant independently of the radial position of the magnetic recording/reproducing head 501, (ii) CLV (Constant Linear Velocity), in which the rotation speed is changed in accordance with the radial position of the magnetic recording/reproducing head 501 so that the linear speed is maintained constant, (iii) ZCAV (Zoned CAV) and ZCLV (Zoned CLV), in each of which the rotation speed is controlled in units of tracks grouped into a zone.

In the case of CAV, the rotary drive control section 510 drives the spindle 506 at a predetermined rotation speed so that the spindle 506 rotates at a constant rotation speed. In the case of CLV, ZCAV, or ZCLV, the rotary drive control section 510 detects the radial and zone positions of the magnetic recording/reproducing head 501, and controls the rotation speed in accordance with the radial and zone positions.

The signal processing section 511 transmits and receives signals to/from the magnetic recording/reproducing head 501. The following concretely describes this. During recording, the signal processing section 511 encodes recording information into (i) an emission pattern of laser light to be emitted from the magnetic recording/reproducing head 501 to the magnetic disk 503, and into (i) a generation pattern of magnetic fields. Then, the emission pattern and the generation pattern are transmitted to the magnetic recording/reproducing head 501. In reproduction, the signal processing section 511 decodes information detected by the magnetic recording/reproducing head 501, thus acquiring information to be reproduced.

The output control section 512 adjusts the output of the laser light to be emitted from the magnetic recording/reproducing head 501. The recording section 513 is a memory in which to store (i) information read out from the magnetic disk 503, (ii) reference information that the signal processing section 511 uses to determine a generation pattern of laser light and a generation pattern of magnetic fields, and (iii) reference information that the output control section 512 uses to determine the output of laser light.

(Operation of Magnetic Recording/Reproducing Apparatus 500)

The following describes operation during a recording and reproduction of the magnetic recording/reproducing apparatus 500.

When the magnetic recording/reproducing apparatus 500 is turned on, the magnetic recording/reproducing head 501 floats above the magnetic disk 503 as described above. Then, the energization of the magnetic recording/reproducing head 501 causes the light source to emit laser light. The near-field light generating section 73 is irradiated with the laser light thus emitted, whereby near-field light is generated. The magnetic field generation source generates a recording magnetic field upon the emission of the laser light from the light source. The output control section 512 herein adjusts the power output of the light source so that the coercitivity in a recording area of a magnetic dot 13 or a magnetic track 17 on the magnetic disk 503 becomes smaller than a recording magnetic field to be applied by the magnetic recording/reproducing head 501, whereby the coercitivity in that area of a magnetic dot 13 or a magnetic track 17 which has been locally heated by the near-field light becomes smaller than the recording magnetic field. Thus, recording is carried out on the magnetic disk 503.

As described above, reproduction of information recorded on the magnetic disk 503 is carried out in such a manner that the magnetic field detecting section of the magnetic recording/reproducing head 501 detects a leakage magnetic field from the magnetic disk 503. The leakage magnetic field thus detected is converted into an electric signal. Thus, information recorded on the magnetic disk 503 is reproduced.

(Supplemental Remarks)

Embodiments 1 through 3 have shown that the magnetic recording media 1a and 1b are suitable for the optically-assisted magnetic recording method. An optically-assisted reproducing method may be applied to both the magnetic recording media 1a and 1b. According to the method, the magnetic recording medium 1a or 1b is irradiated with laser light during reproduction, whereby a leakage magnetic field is detected.

In this case, a concentration of an electric field is caused in the magnetic recording medium 1a or 1b. This makes it possible to carry out optically-assisted reproduction at a laser output lower than ever before. This allows a reduction in the amount of power that is consumed by the light source.

Although the present invention has been concretely described on the basis of the embodiments, the invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The following shows examples to describe modes of the present invention in more detail. Obviously, the present invention is not limited to the following examples, but details of the present invention can be realized in various modes.

EXAMPLES

Example 1

The following describes a method for measuring the field intensity of a magnetic recording medium 1a and a result of the measurement. The field intensity was measured through simulation by an FDTD (Finite Difference Time Domain) method with the magnetic recording medium 1a being irradiated with laser light having a wavelength of 680 nm.

(Method for Measuring Field Intensity)

The following settings were configured for the simulation. The intensity distribution of the laser light was a Gaussian distribution. The spot diameter was 700 nm. The near-field light generating section 73 was realized as a gold thin film having a thickness of 100 nm. The gold thin film had a minute mortar-shaped aperture (with an entry section having a diameter of 400 nm and an exit section having a diameter of 30 nm). The distance between the near-field light generating section 73 and the magnetic recording medium 1a was 5 nm. The polarization of incident light was a circular polarization. The peak intensity ($|E|_2$) of an electric field of the laser light was 1 $(V/m)^2$.

(Result of Measurement of Field Intensity)

FIG. 11 shows a result of the measurement of the field intensity of the magnetic recording medium 1a. FIG. 11 shows the field intensity of the magnetic recording medium 1a being irradiated with the laser light. Note that the top and bottom of FIG. 11 correspond to those vertically inverted of the schematic cross-sectional view of FIG. 1. That is, the magnetic recording medium 1a was irradiated with the laser light emitted from the bottom of FIG. 11.

As shown in FIG. 11, it was confirmed that the irradiation of the laser light caused the generation of near-field light at the minute aperture of the near-field light generating section 73, and a magnetic dot 13 of the magnetic recording medium 1a was irradiated with the near-field light. In addition, an intense concentration of an electric field was measured at dielectric body layers 51 in an area irradiated with the near-field light. Further, an intense local concentration of an electric field was measured with respect to the area irradiated with the near-field light.

As illustrated in FIG. 11, the field intensity ($|E|^2$) measured at the dielectric body layers 51 was nearly equal to that of the exit section of the minute aperture, and was very intense.

The reason for this is as follows: The near-field light, with which a surface of the magnetic recording medium 1a had been irradiated, was converted into plasmons, and the plasmons propagated through an interface between a dielectric body layer 51 and a metallic body layer 52 to form localized plasmons at the interface and thereby cause an intense concentration of an electric field. This makes it possible to heat the magnetic recording medium 1a from within, thus making it possible to heat the entire magnetic dot 13 sufficiently and efficiently while suppressing the amount of power that is consumed by the laser light source.

Comparative Example 1

Field intensity was measured by the same method as in Example 1, except for the use of a magnetic recording medium 100a having, instead of the recording layer 10a, a recording layer 10c in which only a dielectric body layer 51 was formed between two magnetic dots 13.

FIG. 12 shows a result of the measurement of the field intensity of the magnetic recording medium 100a. FIG. 12 shows the field intensity of the magnetic recording medium 100a being irradiated with laser light. As is the case with FIG. 11, the magnetic recording medium 100a was irradiated with the laser light emitted from the bottom of FIG. 12.

As shown in FIG. 12, an intense concentration of an electric field was present only in the vicinity of a surface of the magnetic recording medium 100a. As a result, it was impossible to detect a concentration of an electric field inside the magnetic recording medium 100a.

Comparative Example 2

Field intensity was measured by the same method as in Example 1, except for the use of a magnetic recording medium 100b having, instead of the recording layer 10a, a recording layer 10d in which only a metallic body layer 52 was formed between two magnetic dots 13.

FIG. 13 shows a result of the measurement of the field intensity of the magnetic recording medium 10b. FIG. 13 shows the field intensity of the magnetic recording medium 100b being irradiated with laser light. As is the case with FIGS. 11 and 12, the magnetic recording medium 100b was irradiated with the laser light emitted from the bottom of FIG. 13.

As shown in FIG. 13, an intense concentration of an electric field was present only in the vicinity of a surface of the magnetic recording medium 100c. As a result, it was impossible to detect a concentration of an electric field inside the magnetic recording medium 100c.

Example 2

Optically-assisted magnetic recording was performed on a magnetic disk 31 by use of a slider having a near-field light generating section 73. The magnetic disk 31 was a magnetic recording medium 1a formed into a disk. The formation of recording bits on the magnetic disk 31 was observed by MFM (Magnetic Force Microscopy).

(Arrangement of Magnetic Recording Apparatus)

FIG. 9 illustrates an arrangement of a magnetic recording apparatus that carried out the recording. FIG. 9 illustrates an arrangement of a magnetic recording apparatus 30. The magnetic recording apparatus 30 includes a magnetic disk 31, a slider base 32, an electromagnet 33, a laser light source 70, and a near-field light generating section 73.

Laser light 71 emitted from the laser light source 70 is guided by the near-field light generating section 73 provided to the slider base 32, thereby generating near-field light at the near-field light generating section 73. The magnetic disk 31 is irradiated with the near-field light thus generated. The electromagnet 33 is provided for recording information on the magnetic disk 31 by application of an external recording magnetic field.

The near-field light generating section 73 was made in such a way that a metal thin film having a film thickness of 10 nm was formed on a slider base 32 made of silicon dioxide. Then, a minute aperture having a diameter of 100 nm was formed by FIB.

(Method for Observation by MFM)

The near-field light generating section 73 was irradiated with laser light 71 emitted from the laser light source 70 and having a wavelength of 680 nm. In the recording, the magnetic disk 31 was moved at a linear speed of 0.6 m/s in a direction indicated by an arrow illustrated in FIG. 14. A recording magnetic field was applied by use of the electromagnet 33 at an intensity of ±500 Oe.

For comparison, additional experiments were conducted under the same conditions on magnetic disks 31 that were magnetic recording media 100a and 100b formed into disks, respectively.

(Result of Observation by MFM)

It was confirmed by MFM that an emission intensity of 6 mW or higher of light emitted from the laser light source 70 onto the magnetic disk 31 that was formed from a magnetic recording medium 1a made it possible to form recording bits on the magnetic disk 31 formed from a magnetic recording medium 1a. In contrast, an emission intensity of 8 mW or higher of light emitted from the laser light source 70 was necessary for forming recording bits on the magnetic disk 31 formed from a magnetic recording medium 100a. In the case of the magnetic disk 31 formed from a magnetic recording medium 100b, an emission intensity of 9.5 mW or higher was needed, which is further more intense than that needed in the case of the magnetic disk 31 formed from a magnetic recording medium 100a, since each metallic body layer 52 formed between two magnetic dots 13 was made of a highly conductive metal.

Therefore, the magnetic recording medium 1a, which is characterized in that a dielectric body layer 51 is provided between a magnetic dot 13 and a metallic body layer 52, made it possible to reduce the power of the laser light source in the optically-assisted magnetic recording. Thus, it was confirmed that the magnetic recording medium 1a was capable of reducing the amount of power that is consumed by the laser light source.

Example 3

Field intensity was measured in the same manner as in Example 1, except that a magnetic recording medium 1b was used as a magnetic recording medium.

FIG. 15 shows a result of the measurement of the field intensity of the magnetic recording medium 1b. FIG. 15 shows the field intensity of the magnetic recording medium 1b being irradiated with laser light. Note that the top and bottom of FIG. 15 correspond to those vertically inverted of the schematic cross-sectional view of FIG. 8. That is, the magnetic recording medium 1b was irradiated with the laser light emitted from the bottom of FIG. 15.

As shown in FIG. 15, it was confirmed that the irradiation of the laser light caused the generation of near-field light at the minute aperture of the near-field light generating section 73, and a magnetic track 17 of the magnetic recording medium 1b was irradiated with the near-field light. In addition, an intense concentration of an electric field was measured at dielectric body layers 51 in an area irradiated with the near-field light. Further, an intense local concentration of an electric field was measured with respect to the area irradiated with the near-field light.

As illustrated in FIG. 15, the field intensity ($|E|^2$) measured at the dielectric body layers 51 was nearly equal to that of the exit section of the minute aperture, and was very intense.

The reason for this is as follows: The near-field light, with which a surface of the magnetic recording medium 1a had been irradiated, was converted into plasmons, and the plasmons propagated through an interface between a dielectric body layer 51 and a metallic body layer 52 to form localized plasmons at the interface and thereby cause an intense concentration of an electric field. This makes it possible to heat the magnetic recording medium 1b from within, thus making it possible to heat the entire magnetic track 17 sufficiently and efficiently while suppressing the amount of power that is consumed by the laser light source.

Comparative Example 3

Field intensity was measured by the same method as in Example 3, except for the use of a magnetic recording medium 100c having, instead of the recording layer 10b, a recording layer 10e in which only a dielectric body layer 51 was formed between two magnetic tracks.

FIG. 16 shows a result of the measurement of the field intensity of the magnetic recording medium 100c. FIG. 16 shows the field intensity of the magnetic recording medium 100c being irradiated with laser light. As is the case with FIG. 15, the magnetic recording medium 100c was irradiated with the laser light emitted from the bottom of FIG. 15.

As shown in FIG. 16, an intense concentration of an electric field was present only in the vicinity of a surface of the magnetic recording medium 100c. As a result, it was impossible to detect a concentration of an electric field inside the magnetic recording medium 100c.

Comparative Example 4

Field intensity was measured by the same method as in Example 3, except for the use of a magnetic recording medium 100d having, instead of the recording layer 10b, a recording layer 10f in which only a metallic body layer 52 was formed between two magnetic tracks 17.

FIG. 17 shows a result of the measurement of the field intensity of the magnetic recording medium 100d. FIG. 17 shows the field intensity of the magnetic recording medium 100d being irradiated with laser light. As is the case with FIGS. 15 and 16, the magnetic recording medium 100d was irradiated with the laser light emitted from the bottom of FIG. 17.

As shown in FIG. 17, an intense concentration of an electric field was present only in the vicinity of a surface of the magnetic recording medium 100d. As a result, it was impossible to detect a concentration of an electric field inside the magnetic recording medium 100d.

Example 4

Formation of recording bits on a magnetic disk 31 was measured in the same manner as in Example 2, except that the magnetic disk 31 was a magnetic recording medium 1b formed into a disk.

For comparison, additional experiments were conducted on magnetic disks 31 that were the magnetic recording media 100c and 100d formed into disks, respectively, under the same conditions as those conducted on the magnetic recording medium 1b.

It was confirmed by MFM that an emission intensity of 7 mW or higher of light emitted from a laser light source 70 onto the magnetic disk 31 that was formed from a magnetic recording medium 1b made it possible to form recording bits on the magnetic disk 31 formed from a magnetic recording medium 1b. In contrast, an emission intensity of 8 mW or higher of light emitted from the laser light source 70 was necessary for forming recording bits on the magnetic disk 31 formed from a magnetic recording medium 100c. In the case of the magnetic disk 31 formed from a magnetic recording medium 100d, an emission intensity of 9.5 mW or higher of light was needed, which is further more intense than that needed in the case of the magnetic disk 31 formed from a magnetic recording medium 100c, since each metallic body layer 52 formed between two magnetic tracks 17 was made of a highly conductive metal.

Therefore, the magnetic recording medium 1b, which is characterized in that a dielectric body layer 51 is provided between a magnetic track 17 and a metallic body layer 52, made it possible to reduce the power of the laser light source in the optically-assisted magnetic recording. Thus, it was confirmed that the magnetic recording medium 1b was capable of reducing the amount of power that is consumed by the laser light source.

As described above, a magnetic recording medium according to the present invention is arranged such that magnetic bodies are separated from one another by separators in each of which a metallic body and two first dielectric bodies are alternately stacked, and both sides of each of the magnetic bodies in an in-plane direction of a substrate have contact with two first dielectric bodies, respectively.

Plasmons converted from near-field light can propagate efficiently and selectively through an interface between a metallic body and a first dielectric body having contact with the magnetic body. This makes it possible to cause an intense concentration of an electric field at each side of the magnetic body even with low-intensity near-field light. Plasmons propagate into the magnetic recording medium and cause a concentration of an electric field, and as such, can heat the entire magnetic body from within the magnetic recording medium. Thus, since a concentration of an electric field can be caused around the magnetic body, the entire magnetic body can be heated sufficiently.

This makes it possible to heat the whole of a magnetic body while reducing the amount of power that is consumed by a recording head, thus making it possible to realize stable information recording even with low-intensity near-field light.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

A magnetic recording medium of the present invention is suitably applicable to a magnetic information recording medium on which information is recorded by heating of a magnetic body of the magnetic information recording medium. Specific examples of such a magnetic information recording medium are magnetic disk media typified by hard disks, magnetic tape media, and the like.

The invention claimed is:

1. A magnetic recording medium comprising:
a substrate;
a plurality of magnetic bodies, provided on the substrate, in each of which information is stored by heating of the magnetic body with use of plasmons converted from near-field light; and
a plurality of separators each separating adjacent two of the magnetic bodies from each other in an in-plane direction of the substrate,
the separators each including a metallic body and two first dielectric bodies, the metallic body and the two first dielectric bodies being alternately provided in the in-plane direction of the substrate, the two first dielectric bodies each being provided between the metallic body and a magnetic body,
both sides of each of the magnetic bodies in the in-plane direction having contact with two first dielectric bodies, respectively,
wherein the in-plane direction is a direction that is substantially parallel to a surface on which the magnetic bodies are formed.

2. The magnetic recording medium as set forth in claim 1, further comprising a second dielectric body between the substrate and each of the separators.

3. The magnetic recording medium as set forth in claim 1, wherein the metallic bodies are made of gold, silver, aluminum, platinum, or an alloy containing any one of the metals.

4. The magnetic recording medium as set forth in claim 1, comprising, between the magnetic bodies and the substrate, a soft magnetic body lower in coercitivity than the magnetic bodies.

5. The magnetic recording medium as set forth in claim 1, comprising, on each of the magnetic bodies, an antioxidant film for preventing oxidation of the magnetic bodies.

6. The magnetic recording medium as set forth in claim 1, wherein the separators are provided perpendicularly to a track width direction.

7. The magnetic recording medium as set forth in claim 1, wherein the separators are provided perpendicularly to both a track width direction and a track length direction.

8. A magnetic recording/reproducing apparatus comprising:
near-field light generating means for irradiating, with near-field light, a magnetic recording medium recited in claim 1;
magnetic field applying means for applying a magnetic field to the magnetic recording medium; and
magnetic field detecting means for detecting a leakage magnetic field generated from the magnetic recording medium.

9. A magnetic recording/reproducing method comprising the steps of:
irradiating, with near-field light, a magnetic recording medium recited in claim 1;
recording magnetic information in the magnetic bodies of the magnetic recording medium by applying a magnetic field to the magnetic recording medium; and
reproducing the recorded magnetic information by detecting a leakage magnetic field generated from the magnetic recording medium.

10. The magnetic recording medium as set forth in claim 1, wherein the metallic body has a layer width of not less than 2 nm but not more than 30 nm.

11. The magnetic recording medium as set forth in claim 1, wherein the metallic body has a layer width of not less than 2 nm but not more than 70 nm.

12. The magnetic recording medium as set forth in claim 1, wherein each of the first dielectric bodies has a layer width of not less than 2 nm but not more than 30 nm.

13. The magnetic recording medium as set forth in claim 1, wherein each of the first dielectric bodies has a layer thickness of not less than 2 nm but not more than 30 nm.

* * * * *